(12) United States Patent
Thatte et al.

(10) Patent No.: US 12,392,528 B2
(45) Date of Patent: *Aug. 19, 2025

(54) CONTROL OF REFRIGERATION AND HEAT PUMP SYSTEMS THAT INCLUDE PRESSURE EXCHANGERS

(71) Applicant: Energy Recovery, Inc., San Leandro, CA (US)

(72) Inventors: Azam Mihir Thatte, Kensington, CA (US); Matthew Hans Truax, Alameda, CA (US); Michael Paul Gustafson, Dublin, CA (US); Joseph Michael Marchetti, Spring, TX (US); James Elliott McLean, Jr., Houston, TX (US); David Deloyd Anderson, Castro Valley, CA (US)

(73) Assignee: Energy Recovery, Inc., San Leandro, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/198,134

(22) Filed: May 16, 2023

(65) Prior Publication Data
US 2023/0288101 A1 Sep. 14, 2023

Related U.S. Application Data

(63) Continuation of application No. 17/834,698, filed on Jun. 7, 2022, now Pat. No. 11,692,743.
(Continued)

(51) Int. Cl.
F25B 7/00 (2006.01)
F03G 7/00 (2006.01)
(Continued)

(52) U.S. Cl.
CPC .............. *F25B 7/00* (2013.01); *F03G 7/00* (2013.01); *F25B 9/008* (2013.01); *F25B 13/00* (2013.01);
(Continued)

(58) Field of Classification Search
CPC .... F03G 7/00; F25B 7/00; F25B 41/20; F25B 9/008; F25B 13/00; F25B 30/02;
(Continued)

(56) References Cited

U.S. PATENT DOCUMENTS 2,952,138 A 9/1960 Russell
2,971,343 A 2/1961 Spalding
(Continued)

FOREIGN PATENT DOCUMENTS

CN 1671573 A 9/2005
CN 1806151 A 7/2006
(Continued)

OTHER PUBLICATIONS

International Preliminary Report on Patentability for International Application No. PCT/US2021/040199, mailed Jan. 19, 2023, 14 Pages.
(Continued)

*Primary Examiner* — Larry L Furdge
(74) *Attorney, Agent, or Firm* — Lowenstein Sandler LLP

(57) ABSTRACT

A system includes a pressure exchanger (PX). The PX is coupled to a motor that controls an operating speed of the PX. The system further includes a condenser. An outlet of the condenser is fluidly coupled to a first inlet of the PX. The system further includes a pressure gauge. The pressure gauge is configured to provide first pressure data. The first pressure data is indicative of a pressure of a fluid of the condenser. The system further includes a first controller configured to cause the motor to adjust the operating speed
(Continued)

of the PX. The first controller causes the motor to adjust the operating speed of the PX based on the first pressure data.

20 Claims, 9 Drawing Sheets

Related U.S. Application Data

(60) Provisional application No. 63/208,925, filed on Jun. 9, 2021, provisional application No. 63/278,804, filed on Nov. 12, 2021, provisional application No. 63/285,811, filed on Dec. 3, 2021, provisional application No. 63/287,831, filed on Dec. 9, 2021.

(51) Int. Cl.
  *F25B 9/00* (2006.01)
  *F25B 13/00* (2006.01)
  *F25B 30/02* (2006.01)
  *F25B 39/00* (2006.01)
  *F25B 39/04* (2006.01)
  *F25B 41/20* (2021.01)
  *F25B 49/02* (2006.01)

(52) U.S. Cl.
  CPC .............. *F25B 30/02* (2013.01); *F25B 39/00* (2013.01); *F25B 39/04* (2013.01); *F25B 41/20* (2021.01); *F25B 49/02* (2013.01); *F25B 49/022* (2013.01); *F25B 2600/025* (2013.01); *F25B 2600/13* (2013.01); *F25B 2700/13* (2013.01); *F25B 2700/151* (2013.01); *F25B 2700/1933* (2013.01); *F25B 2700/195* (2013.01); *F25B 2700/21152* (2013.01); *F25B 2700/21173* (2013.01)

(58) Field of Classification Search
  CPC ........ F25B 39/04; F25B 49/02; F25B 49/022; F25B 2600/025; F25B 2600/13; F25B 2700/13; F25B 2700/151; F25B 2700/1933; F25B 2700/195; F25B 2700/21152; F25B 2700/21173
  See application file for complete search history.

(56) References Cited

U.S. PATENT DOCUMENTS

| | | | |
|---|---|---|---|
| 3,158,007 A * | 11/1964 | Kentfield | F04F 13/00 |
| | | | 60/516 |
| 3,347,059 A | 10/1967 | Laing | |
| 3,503,207 A | 3/1970 | Strub | |
| 3,696,634 A | 10/1972 | Ludin | |
| 3,740,966 A | 6/1973 | Pravda | |
| 3,823,573 A | 7/1974 | Cassady | |
| 3,854,301 A | 12/1974 | Cytryn | |
| 3,986,852 A | 10/1976 | Doerner et al. | |
| 3,988,901 A | 11/1976 | Shelton | |
| 4,000,778 A | 1/1977 | Laing | |
| 4,006,602 A | 2/1977 | Fanberg | |
| 4,015,888 A | 4/1977 | Draper et al. | |
| 4,051,888 A | 10/1977 | Yamada | |
| 4,442,677 A | 4/1984 | Kauffman | |
| 4,512,394 A | 4/1985 | Kauffman | |
| 4,524,587 A | 6/1985 | Kantor | |
| 4,823,560 A | 4/1989 | Rowley | |
| 4,887,942 A | 12/1989 | Hauge | |
| 5,284,013 A * | 2/1994 | Keller | F02C 3/30 |
| | | | 60/39.55 |
| 5,336,059 A | 8/1994 | Rowley | |
| 5,503,222 A | 4/1996 | Dunne | |
| 5,647,221 A | 7/1997 | Garris, Jr. | |
| 5,802,870 A | 9/1998 | Arnold | |
| 5,894,719 A * | 4/1999 | Nalim | F02C 3/02 |
| | | | 60/782 |
| 6,158,237 A | 12/2000 | Riffat | |
| 6,178,767 B1 | 1/2001 | Pravda | |
| 6,250,086 B1 | 6/2001 | Cho | |
| 6,389,818 B2 | 5/2002 | Cho | |
| 6,484,519 B1 | 11/2002 | Hesse | |
| 6,773,226 B2 | 8/2004 | Al-Hawaj | |
| 7,207,186 B2 | 4/2007 | Hirota | |
| 7,661,932 B2 | 2/2010 | El-Sayed et al. | |
| 7,799,221 B1 * | 9/2010 | MacHarg | B01D 61/08 |
| | | | 210/321.66 |
| 8,075,281 B2 | 12/2011 | Martin | |
| 9,243,850 B1 | 1/2016 | Bastian | |
| 9,388,817 B1 | 7/2016 | Wright et al. | |
| 9,659,795 B2 | 5/2017 | Okada | |
| 9,695,795 B2 | 7/2017 | Martin | |
| 9,897,336 B2 | 2/2018 | Staffend | |
| 9,920,774 B2 | 3/2018 | Ghasripoor | |
| 10,041,701 B1 | 8/2018 | Koplow | |
| 10,119,379 B2 | 11/2018 | Richter | |
| 10,167,710 B2 | 1/2019 | Ghasripoor | |
| 10,359,075 B2 | 7/2019 | Anderson | |
| 10,557,482 B2 | 2/2020 | Anderson | |
| 10,766,009 B2 | 9/2020 | Oklejas, Jr. | |
| 10,933,375 B1 | 3/2021 | Oklejas, Jr. | |
| 10,989,021 B1 | 4/2021 | Stephenson | |
| 11,073,169 B2 | 7/2021 | Thatte | |
| 2001/0020366 A1 | 9/2001 | Cho | |
| 2002/0025264 A1 | 2/2002 | Polizos et al. | |
| 2004/0052639 A1 | 3/2004 | Al Hawaj | |
| 2004/0250556 A1 | 12/2004 | Sienel | |
| 2005/0006317 A1 * | 1/2005 | Lee | C02F 1/727 |
| | | | 210/205 |
| 2005/0044865 A1 | 3/2005 | Manole | |
| 2005/0132729 A1 | 6/2005 | Manole | |
| 2005/0274132 A1 | 12/2005 | Ohta | |
| 2006/0032808 A1 | 2/2006 | Hauge | |
| 2006/0130495 A1 | 6/2006 | Dieckmann | |
| 2006/0254308 A1 | 11/2006 | Yokoyama | |
| 2007/0137170 A1 | 6/2007 | Bross et al. | |
| 2008/0078192 A1 | 4/2008 | Ignatiev | |
| 2009/0301109 A1 | 12/2009 | Manole | |
| 2010/0024421 A1 | 2/2010 | Litwin et al. | |
| 2011/0051880 A1 | 3/2011 | Al-Mayahi et al. | |
| 2012/0167601 A1 | 7/2012 | Cogswell et al. | |
| 2013/0145759 A1 | 6/2013 | Sonwane et al. | |
| 2013/0280038 A1 | 10/2013 | Martin et al. | |
| 2014/0048143 A1 | 2/2014 | Lehner et al. | |
| 2015/0184492 A1 | 7/2015 | Ghasripoor et al. | |
| 2015/0184502 A1 | 7/2015 | Krish | |
| 2015/0217622 A1 | 8/2015 | Enomoto | |
| 2015/0226466 A1 | 8/2015 | Cupps et al. | |
| 2015/0285101 A1 | 10/2015 | Hikichi | |
| 2015/0292310 A1 * | 10/2015 | Ghasripoor | E21B 43/2607 |
| | | | 166/66.4 |
| 2016/0047361 A1 | 2/2016 | Al-Sulaiman | |
| 2016/0076821 A1 | 3/2016 | Kopko | |
| 2016/0090995 A1 | 3/2016 | Yamada et al. | |
| 2016/0138649 A1 | 5/2016 | Anderson | |
| 2016/0138815 A1 | 5/2016 | Swett | |
| 2016/0160849 A1 | 6/2016 | Gains-Germain | |
| 2016/0252289 A1 | 9/2016 | Feng | |
| 2016/0298500 A1 | 10/2016 | Peter et al. | |
| 2016/0377303 A1 | 12/2016 | Staffend | |
| 2017/0248347 A1 | 8/2017 | Miller | |
| 2017/0356470 A1 | 12/2017 | Jaffrey | |
| 2018/0094648 A1 | 4/2018 | Hoffman et al. | |
| 2018/0347601 A1 | 12/2018 | Hoffman et al. | |
| 2019/0145237 A1 | 5/2019 | Shampine | |
| 2019/0153903 A1 | 5/2019 | Miller | |
| 2019/0390576 A1 | 12/2019 | Thatte | |
| 2020/0191445 A1 | 6/2020 | Liu | |
| 2021/0123551 A1 | 4/2021 | Kuhn De Chizelle | |
| 2022/0011022 A1 | 1/2022 | Thatte | |
| 2022/0011023 A1 | 1/2022 | Thatte | |
| 2022/0307733 A1 | 9/2022 | Thatte | |
| 2022/0381496 A1 | 12/2022 | Thatte | |

(56) References Cited

U.S. PATENT DOCUMENTS

| | | |
|---|---|---|
| 2022/0397310 A1 | 12/2022 | Thatte |
| 2022/0397317 A1 | 12/2022 | Thatte |
| 2022/0397324 A1 | 12/2022 | Thatte |

FOREIGN PATENT DOCUMENTS

| | | |
|---|---|---|
| CN | 101290174 A | 10/2008 |
| CN | 101458000 A | 6/2009 |
| CN | 101506596 A | 8/2009 |
| CN | 102232167 A | 11/2011 |
| CN | 104797897 A | 7/2015 |
| CN | 105180513 A | 12/2015 |
| CN | 205858491 U | 1/2017 |
| CN | 108626902 A | 10/2018 |
| CN | 107076055 B | 11/2018 |
| CN | 107923416 B | 6/2019 |
| CN | 110094907 A | 8/2019 |
| EP | 2035758 B1 | 7/2010 |
| EP | 2995885 A1 | 3/2016 |
| EP | 3489595 A1 | 5/2019 |
| GB | 823689 A | 11/1959 |
| JP | 2010525293 A | 7/2010 |
| KR | 20190133595 A | 12/2019 |
| WO | 8805133 A1 | 7/1988 |
| WO | 9617176 A1 | 6/1996 |
| WO | 9917028 A1 | 4/1999 |
| WO | 2008000793 A1 | 1/2008 |
| WO | 2008019689 A2 | 2/2008 |
| WO | 2008019689 A3 | 4/2008 |
| WO | 2008042693 A1 | 4/2008 |
| WO | 2010039682 A2 | 4/2010 |
| WO | 2011092705 A2 | 8/2011 |
| WO | 2016186572 A1 | 11/2016 |
| WO | 2017125251 A1 | 7/2017 |
| WO | 2022010750 A1 | 1/2022 |

OTHER PUBLICATIONS

International Preliminary Report on Patentability for International Application No. PCT/US2021/040201, mailed Jan. 19, 2023, 16 Pages.

International Search Report and Written Opinion for International Application No. PCT/US2019/039334, mailed Jan. 7, 2020, 15 Pages.

International Search Report and Written Opinion for International Application No. PCT/US2021/040199, mailed Nov. 3, 2021, 16 Pages.

International Search Report and Written Opinion for International Application No. PCT/US2021/040201, mailed Oct. 6, 2021, 30 Pages.

Kerpicci, "A Cooling Device," Full Document, 2007, pp. 1-5.

Search Report received for Danish Patent Office for Application No. 202170359, dated May 4, 2022, 11 Pages.

Search Report received for the Danish Patent Office for Application No. 202170360, dated May 4, 2022, 9 Pages.

International Search Report and Written Opinion of International patent application No. PCT/US2022/032709 dated Sep. 8, 2022, 7 pages.

International Search Report and Written Opinion of International patent application No. PCT/US2022/032722 dated Nov. 4, 2022, 28 pages.

International Search Report and Written Opinion of International patent application No. PCT/US2022/032714 dated Nov. 15, 2022, 28 pages.

Fricke, et al. "Increasing the Efficiency of a Carbon Dioxide Refrigeration System Using a Pressure Exchanger". Retrieved from <https://www.osli.gov/biblio.1560413>, Aug. 1, 2021, 7 pages.

Website entitled Ammonia (R-717) vs. CO2 (R-744) Refrigeration Systems, retrieved from 2, 3/(2), 4/3/(2) <https://web.archive.org/web/20200207080147/http://www.ddref.com/RefrigerantSystems/ProsV sCons> (Discovery Designs Refrigeration LLC) Feb. 7, 2020 (Feb. 7, 2020), entire document, especially p. 1.

Chinese search report for Application No. 202280006217.6, mailed Aug. 25, 2023, 3 Pages.

Extended European Search Report for European Application No. EP21837510.3, mailed Feb. 19, 2024, 10 Pages.

International Search Report and Written Opinion for International Application No. PCT/US2023/082581, mailed Mar. 19, 2024, 15 Pages.

Office Action for Denmark Patent Application No. PA202370623, mailed Mar. 5, 2024, 10 Pages.

Extended European Search Report for European Application No. 24154723.1, mailed May 28, 2024, 8 Pages.

* cited by examiner

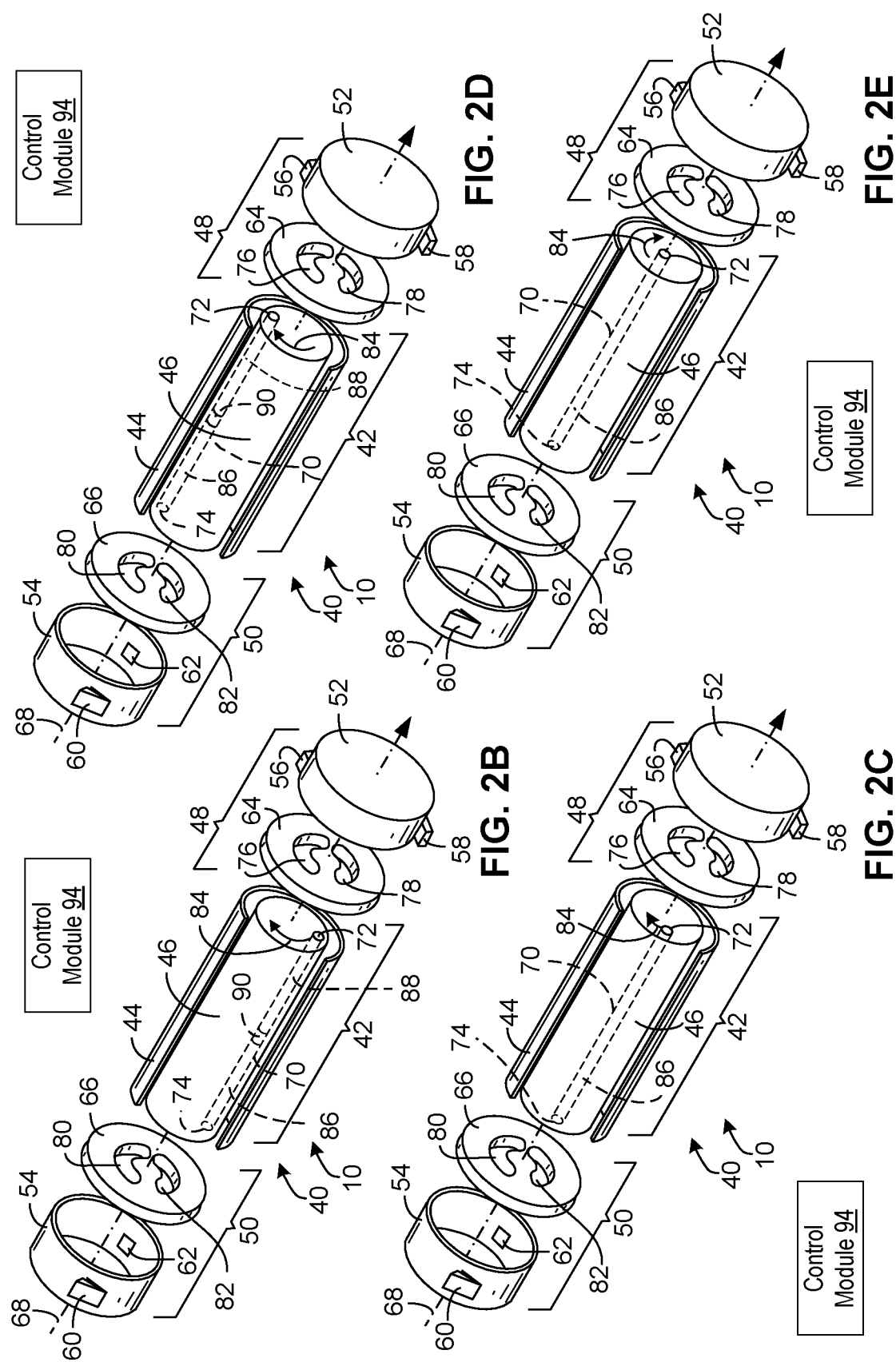

CONTROL OF REFRIGERATION AND HEAT PUMP SYSTEMS THAT INCLUDE PRESSURE EXCHANGERS

RELATED APPLICATION

This application is a continuation of U.S. patent application Ser. No. 17/834,698 filed Jun. 7, 2022, which claims the benefit of Provisional Application No. 63/208,925, filed Jun. 9, 2021, Provisional Application No. 63/278,804, filed Nov. 12, 2021, Provisional Application No. 63/285,811, filed Dec. 3, 2021, and Provisional Application No. 63/287,831, filed Dec. 9, 2021, the contents of which are hereby incorporated by reference in their entirety.

TECHNICAL FIELD

The present disclosure relates to control of systems, and, more particularly, control of refrigeration and heat pump systems that include pressure exchangers.

BACKGROUND

Systems use fluids at different pressures. Systems use pumps and/or compressors to increase pressure of fluid. Energy usage of a fluid handling system may be largely consumed by pumps and/or compressors increasing fluid pressure.

BRIEF DESCRIPTION OF THE DRAWINGS

The present disclosure is illustrated by way of example, and not by way of limitation in the figures of the accompanying drawings.

FIGS. 2A-E are exploded perspective views of pressure exchangers (PXs), according to some embodiments.

DETAILED DESCRIPTION OF EMBODIMENTS

Figure 1A:
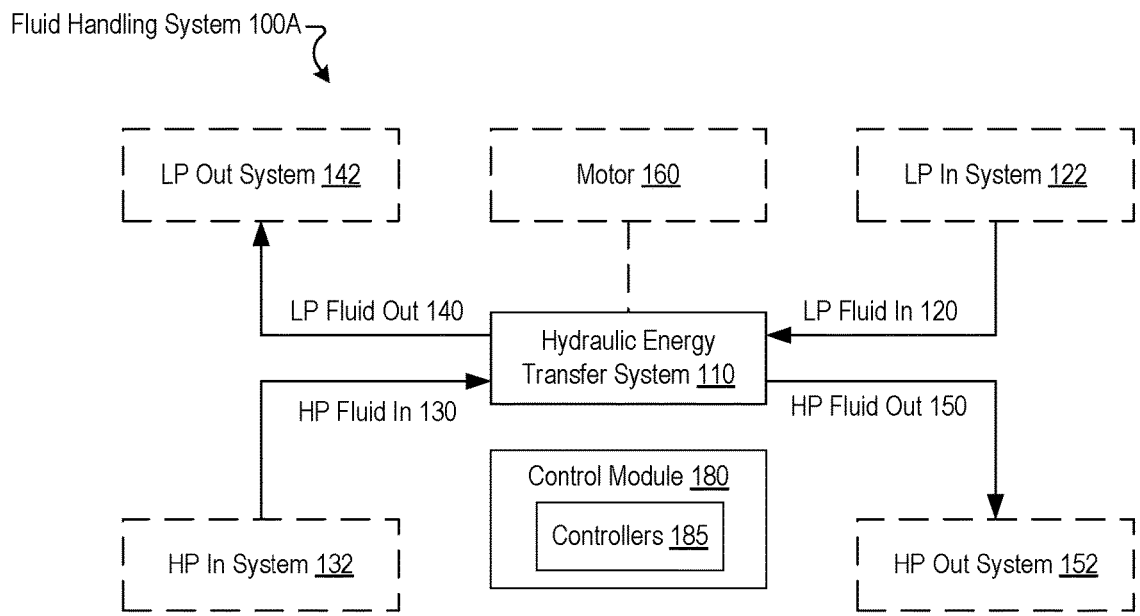
FIG. 1A is a schematic diagram of a fluid handling system that includes a hydraulic energy transfer system, according to some embodiments.

Embodiments described herein are related to control of refrigeration and/or heat pump systems that include pressure exchangers (e.g., control of refrigeration systems, heat pump systems, pressure exchanger systems, fluid handling systems that include a pressure exchanger, heat transfer systems, control systems for carbon dioxide ($CO_2$) refrigeration systems integrated with rotary pressure exchanger, etc.). In particular, control modules for controlling, maintaining, adjusting, etc., operation of systems including one or more pressure exchangers are described.

Systems may use fluids at different pressures. A supply of a fluid to a system may be at lower pressure, and one or more portions of the system may operate at higher pressures. A system may include a closed loop with various fluid pressures maintained in different portions of the loop. These systems may include hydraulic fracturing (e.g., fracking or fracing) systems, desalinization systems, refrigeration systems, heat pump systems, energy generation systems, mud pumping systems, slurry pumping systems, industrial fluid systems, waste fluid systems, fluid transportation systems, etc. Pumps or compressors may be used to increase pressure of fluids of such systems.

Conventionally, heat transfer systems (e.g., refrigeration systems, heat pump systems, reversible heat pump systems, or the like) use pumps or compressors to increase the pressure of a fluid (e.g., a refrigeration fluid such as carbon dioxide ($CO_2$), R-744, R-134a, hydrocarbons, hydrofluorocarbons (HFCs), hydrochlorofluorocarbons (HCFCs), ammonia ($NH_3$), refrigerant blends, R-407A, R-404A, etc.). Conventionally, separate pumps or compressors mechanically coupled to motors are used to increase pressure of the fluid in any portion of a system including an increase in fluid pressure. Pumps and compressors, especially those that operate over a large pressure differential (e.g., cause a large pressure increase in the fluid), require large quantities of energy. Conventional systems thus expend large amounts of energy increasing the pressure of the fluid (via the pumps or compressors driven by the motors). Additionally, conventional heat transfer systems decrease the pressure of the fluid through expansion valves and/or heat exchangers (e.g., condensers and/or evaporators, etc.). Conventional systems inefficiently increase pressure of fluid and decrease pressure of the fluid. This is wasteful in terms of energy used to run the conventional systems (e.g., energy used to repeatedly increase the pressure of the refrigeration fluid to cause increase or decrease of temperature of the surrounding environment).

The systems, devices, and methods of the present disclosure enable control of systems (e.g., fluid handling systems, heat transfer systems, refrigeration systems, heat pump systems, cooling systems, heating systems, etc.) including one or more pressure exchangers (PXs). In a system, a PX may be configured to exchange pressure between a first fluid (e.g., a high pressure portion of a refrigeration fluid in a refrigeration cycle) and a second fluid (e.g., a low pressure portion of the refrigeration fluid in the refrigeration cycle). The PX may receive the first fluid (e.g., a portion of the refrigeration fluid at high pressure) via a first inlet (e.g., a high pressure inlet) and a second fluid (e.g., a portion of the refrigeration fluid at a low pressure) via a second inlet (e.g., a low pressure inlet). When entering the PX, the first fluid may be of a higher pressure than the second fluid. The PX may exchange pressure between the first fluid and the second fluid. The first fluid may exit the PX via a first outlet (e.g., a low pressure outlet) and the second fluid may exit the PX via a second outlet (e.g., a high pressure outlet). When exiting the PX, the second fluid may have a higher pressure than the first fluid (e.g., pressure has been exchanged between the first fluid and the second fluid).

In some embodiments, a heat transfer system (e.g., refrigeration system, heat pump system, etc.) may target controlled operating conditions. For example, a refrigeration system may target a particular temperature of a refrigerated zone (e.g., for safe storage of perishable materials such as food, medication, scientific or research materials, or the like); a heat pump system may target a comfortable interior temperature for a home; a system may target a rate of heat exchange between the system and the environment; one or more portions of a system may target an operating temperature, pressure, fluid density, or the like; etc. Operational parameters to maintain target conditions may be dependent on many factors, e.g., ambient temperature; mass, type, and initial temperature of material in a temperature-controlled area; frequency of exchange of material and/or energy between a controlled area and the ambient environment; and the like.

In some embodiments, the PX may be coupled to a motor. The motor may be configured to control an operating speed of the PX. The operating speed of the PX may have an impact on fluid flow rate, fluid pressure in various portions of the fluid handling system, etc. In some embodiments, the motor may drive the PX, e.g., if faster flow rate through the PX is targeted, the motor may speed up operation of the PX. In some embodiments, the motor may serve to inhibit the PX, e.g., if slower flow rate through the PX is targeted, the motor may inhibit motion of the PX to maintain a desired flow rate. A controller may be operatively coupled to the motor of the PX. The controller may receive data collected from one or more parts of the fluid handling system, e.g., pressure data indicative of fluid pressure associated with (e.g., in, exiting from) a condenser of the fluid handling system, flow rate data indicative of flow rate through a portion of the fluid handling system, or the like. The controller may generate a control signal for the motor based on the data received indicative of one or more operating conditions of the fluid handling system. The motor may be configured to adjust an operating speed of the PX based on the control signal.

In some embodiments, the fluid handling system includes a receiver (e.g., a flash tank). The receiver may be configured to receive the first fluid output from the low pressure outlet of the PX. The receiver may form a chamber where gas and liquid of the low pressure first fluid may separate. The fluid handling system may further include a pump (e.g., a low pressure booster pump) fluidly coupled between a gas outlet of the receiver and the low pressure inlet of the PX. The fluid handling system may further include a sensor configured to provide an indication of one or more characteristics of the first fluid output by the low pressure outlet of the PX. For example, a density meter may be used to determine a liquid/gas ratio of the first low-pressure fluid. A controller may receive data (e.g., fluid density data) indicative of one or more characteristics of the first low-pressure fluid. The controller may generate a control signal for the pump (e.g., the low pressure booster pump) based on the data. The pump may be configured to adjust operation of the pump (e.g., adjust a pumping speed) based on the control signal. For example, more or less gas may be supplied to the low pressure inlet of the PX to achieve target operation (e.g., a target energy efficiency, a threshold pressure transfer efficiency, etc.), optimal operation (e.g., maximum energy efficiency, maximum heat transfer efficiency, etc.), or the like. In some embodiments, operation of the pump may be adjusted to minimize mixing of the first and second fluids in the PX (e.g., to minimize the amount of gas that travels from the low pressure inlet of the PX to the low pressure outlet of the PX).

In some embodiments, the fluid handling system may include a receiver (e.g., flash tank) and an evaporator fluidly coupled to a liquid outlet of the receiver. The evaporator may be configured to exchange heat between the fluid of the fluid handling system and the environment, e.g., the fluid may absorb heat from the environment, cooling the area around the evaporator, as liquid of the fluid evaporates. The system may further include a valve fluidly coupled between the liquid outlet of the receiver and the evaporator. The system may further include one or more sensors, configured to provide sensor data associated with operation of the evaporator. For example, the system may include a temperature sensor measuring the temperature of fluid output by the evaporator, a pressure sensor measuring the pressure of fluid output by the evaporator, etc. In some embodiments, one or more operational parameters of the evaporator are targeted. For example, target output of the evaporator may include gas and no liquid. A target value (e.g., target range of values) of super heat (e.g., a temperature above the temperature of the liquid/gas transition temperature of a fluid) may be chosen for operation (e.g., high enough to protect liquid-sensitive components downstream, low enough to enable high evaporator efficiency, etc.). The system may further include a controller, operationally coupled to the valve that is disposed between the liquid outlet of the receiver and the evaporator. The controller may receive data from one or more sensors associated with operation of the evaporator. The controller may generate a control signal for the valve based on the data. The valve may be configured to adjust an opening in the valve (e.g., to adjust a flow rate through the valve, a pressure differential across the valve, etc.) based on the control signal.

In some embodiments, the fluid handling system may include one or more compressors. The one or more compressors may be configured to increase pressure of a gas from a low pressure to a high pressure, e.g., to be used as input to the high pressure inlet of the PX. In some embodiments, one or more sensors may be configured to measure one or more conditions of operation of the fluid handling system. For example, a pressure gauge may measure the pressure of the fluid on the input side of a compressor, a pressure gauge may measure the pressure of the fluid on the output side of a compressor, etc. The fluid handling system may include a controller operatively coupled to a compressor. The fluid handling system may include a controller associated with each compressor, a controller associated with multiple compressors, etc. The controller may generate a control signal for a compressor based on measurements received from one or more sensors. The compressor may be configured to adjust operation of the compressor based on the control signal.

In some embodiments, the fluid handling system may include a receiver (e.g., flash tank) and a bypass valve fluidly coupled between an outlet of the receiver (e.g., a gas outlet of the receiver) and an outlet of an evaporator (e.g., flow through the bypass valve may bypass the evaporator). One or more sensors may provide measurements indicative of a state of the fluid handling system, e.g., a pressure gauge may measure the pressure inside the receiver. The fluid handling system may further include a controller operatively coupled to the bypass valve. The controller may generate a control signal for the bypass valve based on the measurements from the one or more sensors (e.g., based on receiver pressure). The bypass valve may be configured to adjust an opening of the bypass valve (e.g., which may affect fluid flow through the valve, pressure differential across the valve, etc.) responsive to receiving the control signal.

In some embodiments, the fluid handling system may include a pump fluidly coupled between the high pressure outlet of the PX and the high pressure inlet of the PX (e.g., a high pressure booster pump disposed before a condenser of a heat transfer system). One or more sensors may make measurements indicative of a conditions of the fluid handling system affected by the pump, e.g., a pressure gauge may measure the fluid pressure of fluid output by the pump, of fluid associated with (e.g., near, exiting, entering) the condenser, etc. A controller may generate a control signal based on measurement data received from the one or more sensors. The pump may be configured to adjust operation of the pump (e.g., adjust pumping speed) based on the control signal.

Systems, devices, and methods of the present disclosure provide advantages over conventional solutions. Systems of the present disclosure reduce energy consumption compared to conventional systems. For example, use of a PX in a heat transfer system of the present disclosure may recover energy stored as pressure and transfer that energy back into the system, reducing the energy cost of operating the heat transfer system. Various controllers employed by the system may increase energy efficiency of the system by, for example, maximizing the transfer of pressure from the first fluid to the second fluid via the PX (e.g., by adjusting fluid flow rates, fluid pressures, PX operating speed, or the like). Systems of the present disclosure may reduce wear on components (e.g., pumps, compressors) compared to conventional systems. Introduction of a PX may reduce the pumping load on one or more pumps/compressors, e.g., may reduce a target pressure differential a compressor is to achieve. One or more controllers (e.g., control system) may improve operation of pumps and compressors by enabling operation at a target pumping speed, e.g., a pumping speed selected to meet target system output (e.g., maintain a target temperature in a heat transfer system) while protecting one or more components of the system (e.g., a minimum viable pumping speed). Systems of the present disclosure may protecting one or more components from damage. For example, a compressor of the system may be sensitive to the phase of material provided to the compressor (e.g., may be configured to compress a gas, may become damaged if supplied with liquid, etc.). A controller of the system may alter one or more operating parameters of the system (e.g., a fluid flow rate, a pumping speed, PX operating speed, etc.) to maintain a supply of gas to the compressor (e.g., by maintaining a target value of super heat of the gas). Systems of the present disclosure may allow for more flexibility in component selection for a fluid handling system. For example, one or more controllers (e.g., control system) may be operatively coupled, and may work together to maintain one or more operating conditions. For example, a system may include multiple controllers (e.g., control system) operatively coupled to multiple components (e.g., configured to facilitate adjustment of one or more operating parameters of the components). Multiple control signals may be generated to achieve one or more target tasks, e.g., temperature of a region associated with a heat transfer system may be maintained, and load on a pump may be kept within a target range. By utilizing multiple controllers of a system, such goals may be achievable, and/or the user may be able to use a greater selection of components in the system (e.g., may include a pump with a small manufacturer recommended operating pressure range in a system where pressure at the pump can be maintained within that range for a variety of operating conditions).

Although some embodiments of the present disclosure are described in relation to pressure exchangers, energy recovery devices, and hydraulic energy transfer systems, the current disclosure can be applied to other systems and devices (e.g., pressure exchanger that is not isobaric, rotating components that are not a pressure exchanger, a pressure exchanger that is not rotary, systems that do not include pressure exchangers, etc.).

Although some embodiments of the present disclosure are described in relation to exchanging pressure between fluid used in fracing systems, desalinization systems, heat pump systems, and/or refrigeration systems, the present disclosure can be applied to other types of systems. Fluids can refer to liquid, gas, transcritical fluid, supercritical fluid, subcritical fluid, and/or combinations thereof.

In some aspects of the present disclosure, a system includes a pressure exchanger (PX). The PX comprises a motor that controls an operating speed of the PX. The system further includes a condenser, wherein an outlet of the condenser is fluidly coupled to a first inlet (e.g., a high pressure inlet) of the PX. The system further includes a first pressure gauge configured to generate first pressure data indicative of a pressure of a fluid of the condenser. The system further includes a first controller operatively coupled to the motor of the PX. The first controller is to generate a first control signal based on the first pressure data. The motor of the PX is configured to adjust the operating speed of the PX based on the first control signal. The system further includes a pump. The outlet of the pump is fluidly coupled to a second inlet (e.g., a low pressure inlet) of the PX. The system further includes a fluid density sensor for generating fluid density data associated with a first output fluid of the PX (e.g., a low pressure output fluid). The system further includes a second controller operatively coupled to the pump. The second controller is to generate a second control signal based on at least the fluid density data. The pump is to adjust an operating speed of the pump based on the second control signal.

In some aspects of the present disclosure, a method includes receiving pressure data indicative of a fluid pressure of a fluid of a condenser of a heat transfer system. The method further includes generating a control signal based on at least the pressure data. The method further includes providing the control signal to a motor coupled to a PX. The motor is configured to adjust a speed of operation of the PX in view of the control signal.

In some aspects of the present disclosure, a method includes receiving fluid density data indicative of density of a fluid associated with an outlet (e.g., a low pressure outlet) of a PX of a heat transfer system. The method further includes generating a control signal based on at least the fluid density data. The method further includes providing the control signal to a pump. Output of the pump is fluidly coupled to an inlet (e.g., a low pressure inlet) of the PX. The pump is configured to adjust a speed of operation of the pump based on the control signal.

FIG. 1A illustrates a schematic diagram of a fluid handling system 100A (e.g., heat transfer system) that includes a hydraulic energy transfer system 110, according to certain embodiments.

In some embodiments, a hydraulic energy transfer system 110 includes a pressure exchanger (e.g., PX). The hydraulic energy transfer system 110 (e.g., PX, a collection of components including a PX, etc.) receives low pressure (LP) fluid in 120 (e.g., via a low-pressure inlet) from an LP in system 122. The hydraulic energy transfer system 110 also receives high pressure (HP) fluid in 130 (e.g., via a high-pressure inlet) from HP in system 132. The hydraulic energy transfer system 110 (e.g., PX) exchanges pressure between the HP fluid in 130 and the LP fluid in 120 to provide LP fluid out 140 (e.g., via low-pressure outlet) to LP fluid out system 142 and to provide HP fluid out 150 (e.g., via high-pressure outlet) to HP fluid out system 152. A controller 180 may cause an adjustment of flowrates of HP fluid in 130 and LP fluid out 140 by one or more flow valves, pumps, and/or compressors (not illustrated). The controller 180 may cause flow valves to actuate.

In some embodiments, the hydraulic energy transfer system 110 includes a PX to exchange pressure between the HP fluid in 130 and the LP fluid in 120. In some embodiments, the PX is substantially or partially isobaric (e.g., an isobaric pressure exchanger (IPX)). The PX may be a device that transfers fluid pressure between HP fluid in 130 and LP fluid in 120 at efficiencies (e.g., pressure transfer efficiencies, substantially isobaric) in excess of approximately 50%, 60%, 70%, 80%, 90%, or greater (e.g., without utilizing centrifugal technology). High pressure (e.g., HP fluid in 130, HP fluid out 150) refers to pressures greater than the low pressure (e.g., LP fluid in 120, LP fluid out 140). LP fluid in 120 of the PX may be pressurized and exit the PX at high pressure (e.g., HP fluid out 150, at a pressure greater than that of LP fluid in 120), and HP fluid in 130 may be at least partially depressurized and exit the PX at low pressure (e.g., LP fluid out 140, at a pressure less than that of the HP fluid in 130). The PX may operate with the HP fluid in 130 directly applying a force to pressurize the LP fluid in 120, with or without a fluid separator between the fluids. Examples of fluid separators that may be used with the PX include, but are not limited to, pistons, bladders, diaphragms, and/or the like.

In some embodiments, PXs may be rotary devices. Rotary PXs, such as those manufactured by Energy Recovery, Inc. of San Leandro, Calif., may not have any separate valves, since the effective valving action is accomplished internal to the device via the relative motion of a rotor with respect to end covers. In some embodiments, rotary PXs operate with internal pistons to isolate fluids and transfer pressure with relatively little mixing of the inlet fluid streams. In some embodiments, rotary PXs operate without internal pistons between the fluids.

In some embodiments, PXs may be reciprocating devices. Reciprocating PXs may include a piston moving back and forth in a cylinder for transferring pressure between the fluid streams. For example, a reciprocating PX may include one or more pressure exchange chambers. The pressure exchange chambers may each include a piston. First fluid at a high pressure may be allowed into one side of a pressure exchange chamber to transfer energy (e.g., via displacement of the piston) to a second fluid at a low pressure on the opposite side of the pressure exchange chamber. The first fluid, now at a low pressure, may then be allowed to drain from the pressure exchange chamber, as the second fluid, now at a high pressure, it utilized for operation of the fluid handling system (e.g., for desalinization, fracing, refrigeration, heat transfer, or the like). Low pressure second fluid may then be allowed to fill the second side of the pressure exchange chamber, and subsequently high pressure first fluid may be introduced into the first side of the pressure exchange chamber to transfer energy to another portion of the second fluid. A reciprocating device may include many pressure exchange chambers operating in a cycle for substantially continuous flow of high pressure second fluid from the device.

In some embodiments, PXs may be hydraulic turbocharger devices. A hydraulic turbocharger PX may introduce a first fluid at a high pressure to a chamber including a first impeller. The first high pressure fluid may cause the impeller to rotate by transferring energy from the first fluid to the impeller. The first impeller may be coupled to a shaft that is further coupled to a second impeller in a separate chamber. Rotation of the first impeller may cause rotation of the second impeller. The second impeller may be in contact with a second fluid at a low pressure. Rotation of the impeller may transfer energy to the second fluid (e.g., increase pressure of the second fluid).

Any PX or multiple PXs may be used in the present disclosure, such as, but not limited to, rotary PXs, reciprocating PXs, hydraulic turbocharger PXs, or any combination thereof. In addition, the PX may be disposed on a skid separate from the other components of a fluid handling system 100A (e.g., in situations in which the PX is added to an existing fluid handling system). For example, the PX may be fastened to a structure that can be moved from one site to another. The PX may be coupled to a system (e.g., pipes of a system, etc.) that has been built on-site. The structure to which the PX is fastened may be referred to as a 'skid.'

In some embodiments, a motor 160 is coupled to hydraulic energy transfer system 110 (e.g., to a PX). In some embodiments, the motor 160 controls the speed of a rotor of the hydraulic energy transfer system 110 (e.g., to increase pressure of HP fluid out 150, to decrease pressure of HP fluid out 150, etc.). In some embodiments, motor 160 generates energy (e.g., acts as a generator) based on pressure exchanging in hydraulic energy transfer system 110. For example, a pressure differential (e.g., a difference between the pressure of LP fluid in 120 and HP fluid in 130) may drive rotation of a rotary PX, and motor 160 may introduce resistance to that rotation to both slow the rotation and generate electricity.

The hydraulic energy transfer system 110 may include a hydraulic turbocharger or hydraulic pressure exchanger, such as a rotating PX. The PX may include one or more chambers and/or channels (e.g., 1 to 100) to facilitate pressure transfer between first and second fluids (e.g., gas, liquid, multi-phase fluid).

In some embodiments, hydraulic energy transfer system 110 may transfer energy (e.g., pressure) between two fluids of substantially different composition, phase, or the like. For example, a PX of hydraulic energy transfer system 110 may transfer pressure between a first fluid (e.g., pressure exchange fluid, such as a proppant free fluid, substantially proppant free fluid, lower viscosity fluid, fluid that has lower than a threshold amount of certain chemicals, etc.) and a second fluid that may have a higher viscosity (e.g., be highly viscous), include more than a threshold amount of certain chemicals (e.g., corrosive chemicals), and/or contain solid particles (e.g., frac fluid containing sand, proppant, powders, debris, ceramics, etc.). By transferring energy from one type of fluid to another, expensive components such as pumps may be protected from coming into contact with fluids that may be harmful to them, such as viscous, corrosive, or abrasive fluids.

In some embodiments, hydraulic energy transfer system 110 may transfer energy (e.g., pressure) between two fluids of substantially similar compositions. For example, in some conventional systems, a waste stream of the system may include fluid at a high pressure. Hydraulic energy transfer system 110 may accept as high pressure input (e.g., HP fluid in 130) the high pressure waste stream and transfer energy from that stream to a low pressure work stream (e.g., LP fluid in 120). In some systems, such as a closed refrigeration system, energy may be recovered from a high pressure portion of a fluid stream to reduce pump and/or compressor requirements on the fluid stream.

In some embodiments, LP in system 122 includes a booster (e.g., a pump and/or a compressor) to increase pressure of fluid to form LP fluid in 120. In some embodiments, LP in system 122 receives a gas from LP out system 142. In many embodiments, LP in system 122 receives fluid from a receiver (e.g., flash tank). The receiver may receive LP fluid out 140 output from hydraulic energy transfer system 110.

Fluid handling system 100A further includes control module 180. Control module 180 may include one or more controllers 185. Control module 180 may be configured to perform any of the methods of FIGS. 4A-B. Controllers 185 of control module 180 may receive data (e.g., measurement data) from sensors associated with fluid handling system 100A. Controllers 185 may be configured to generate control signals based on operations parameters (e.g., threshold values, designated operating ranges, target parameter values, etc.) and/or data received from the sensors. Controllers 185 may include a single device performing one or more control tasks, separate devices for each control task (e.g., each controllable component of fluid handling system 100A), etc. For example, operations of each of the controllers 185 may be performed by a separate device, or operations of all of the controllers 185 may be performed by a single device, or a combination of separate and combined devices may be employed. Components of control module 180 may include general computing devices, personal computers (PCs), laptops, mobile phones, tablet computers, netbook computers, microcontrollers, purpose-built controllers (e.g., hardware, circuitry, etc.), proportional integral derivative (PID) controllers (e.g., three-term controllers), a web appliance, or any other device capable of executing a set of instructions (sequential or otherwise) that specify actions to be taken by that device. Control module 180 may include multiple controllers acting separately (e.g., without input between from one controller to another, without measurement data from one sensor feeding into multiple controllers, etc.). Control module 180 may include multiple controllers working in conjunction with one another, e.g., a target adjustment to operating parameters of the fluid handling system 110A (e.g., as reported by one or more sensor of the system) may include adjustment of operation of one or more components of the system by one or more controllers of control module 180.

Fluid handling system 100A may additionally include one or more sensors to provide sensor data (e.g., flowrate data, pressure data, velocity data, etc.) associated with the fluids of fluid handling system 100A. Controllers 185 may control one or more flow rates of fluid handling system 100A, operation of one or more components of fluid handling system 100A (e.g., operation of motor 160, operation of one or more pumps, etc.), or the like based on the sensor data. In some embodiments, controllers 185 cause one or more flow valves to actuate based on sensor data received.

The hydraulic energy transfer system 110 may be used in different types of systems, such as fracing systems, desalination systems, refrigeration systems (e.g., FIG. 1B), heat pump systems, slurry pumping systems, industrial fluid systems, waste fluid systems, fluid transportation systems, etc.

Figure 1B:
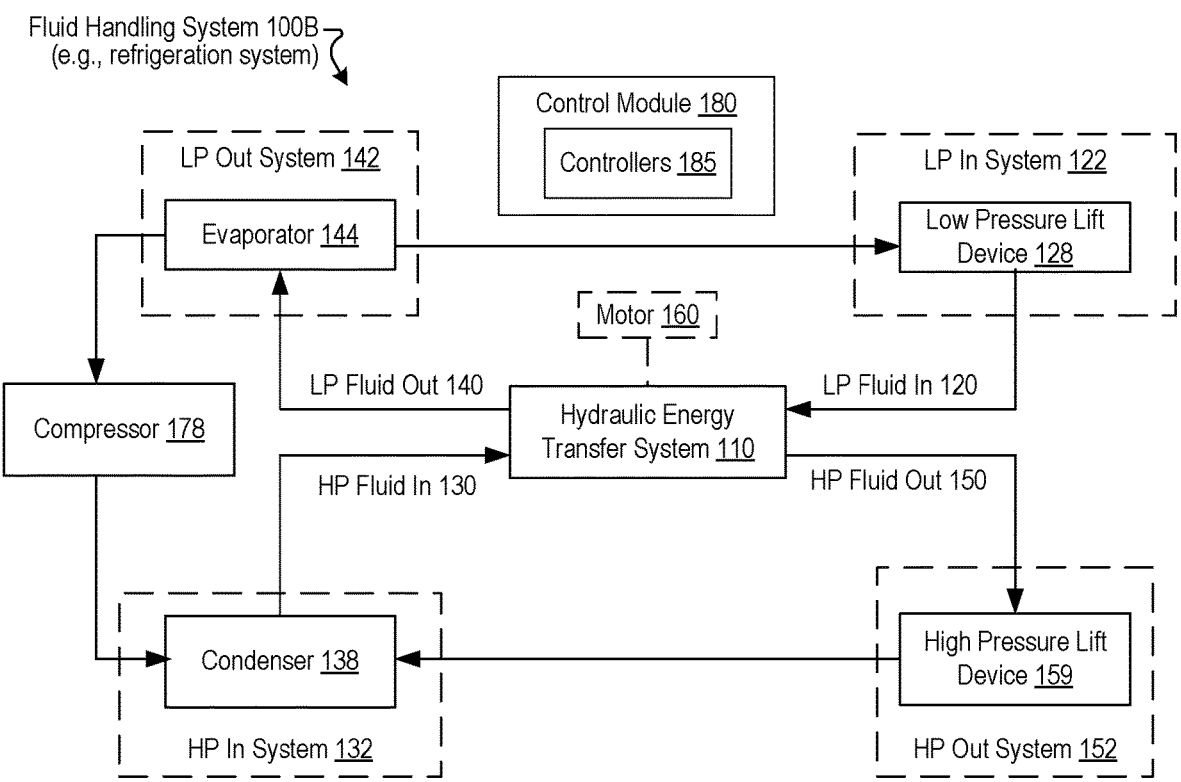
FIG. 1B is a schematic diagram of a fluid handling system including a hydraulic energy transfer system, according to some embodiments.
Figure 2A:
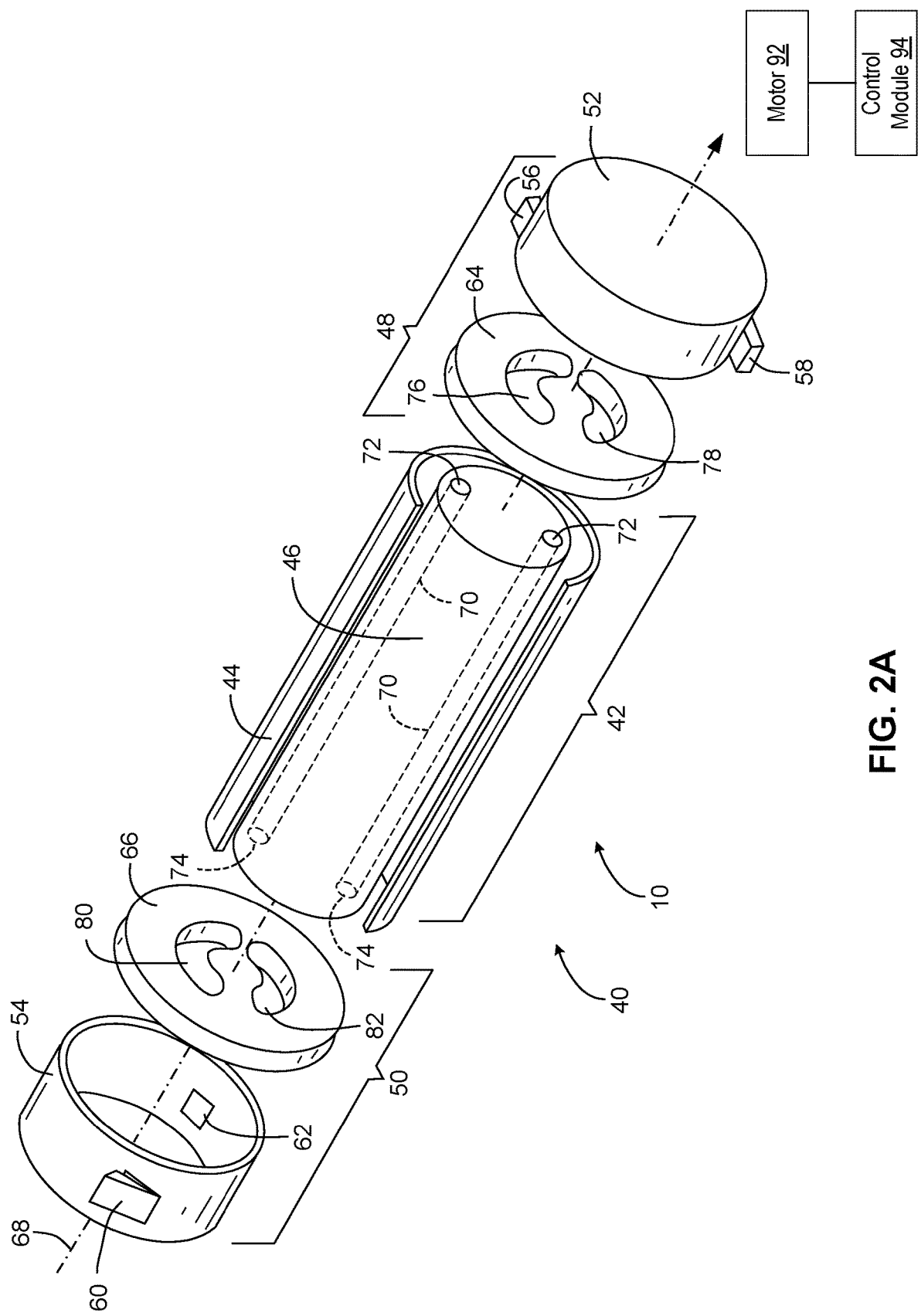

FIG. 1B illustrates a schematic diagram of a fluid handling system 100B including a hydraulic energy transfer system 110, according to certain embodiments. Fluid handling system 100B may be, for example, a heat transfer system, a refrigeration system or a heat pump system. Fluid handling system 100B may be configured to cool and/or heat an environment (e.g., an indoor space, a refrigerator, a freezer, etc.). In some embodiments, fluid handling system 100B includes more components, less components, same routing, different routing, and/or the like than that shown in FIG. 1B. Some of the features in FIG. 1B that have similar reference numbers as those in FIG. 1A may have similar properties, functions, and/or structures as those in FIG. 1A.

Hydraulic energy transfer system 110 (e.g., PX) may receive LP fluid in 120 from LP in system 122 (e.g., low pressure lift device 128, low pressure fluid pump, low pressure booster pump, low pressure compressor, low pressure ejector, etc.) and HP fluid in 130 from HP in system 132 (e.g., condenser 138, gas cooler, heat exchanger, etc.). The hydraulic energy transfer system 110 (e.g., PX) may exchange pressure between the LP fluid in 120 and HP fluid in 130 to provide HP fluid out 150 to HP out system 152 (e.g., high pressure lift device 159, high pressure fluid pump, high pressure booster pump, high pressure compressor, high pressure ejector, etc.) and to provide LP fluid out 140 to LP out system 142 (e.g., evaporator 144, heat exchanger, etc.). The LP out system 142 (e.g., evaporator 144) may provide the fluid to compressor 178 and low pressure lift device 128. The evaporator 144 may provide the fluid to compressor 178 and/or to the low pressure lift device 128. In some embodiments a different component may provide fluid to low pressure lift device 128, evaporator 144, etc. For example, LP fluid out 140 may be provided to a receiver of flash tank. Liquid output from the flash tank may be provided to evaporator 144, and gas output of the flash tank may be provided to low pressure lift device 128. In some embodiments, additional valves, lines, pipes, fluid flow paths, etc., may provide fluid to different devices in different orders and/or combinations. The condenser 138 may receive fluid from compressor 178 and high pressure lift device 159. Controller 180 may control one or more components of fluid handling system 100B. High pressure lift device 159 may be a high pressure booster and low pressure lift device 128 may be a low pressure booster.

The fluid handling system 100B may be a closed system. LP fluid in 120, HP fluid in 130, LP fluid out 140, and HP fluid out 150 may all be a fluid (e.g., refrigerant, the same fluid) that is circulated in the closed system of fluid handling system 100B.

Fluid handling system 100B may additionally include one or more sensors configured to provide sensor data associated with the system. For example, sensors may report on properties of the fluid at various stages of the system (e.g., various components of the system) such as temperature, pressure, flow rate, density, etc. Sensors may measure properties related to the function of fluid handling system 100B, e.g., a refrigeration system may include one or more temperature sensors reporting on the temperature of the region to be refrigerated. Sensors may measure properties influencing operation of fluid handling system 100B, e.g., a heat transfer system intended to heat a region associated with condenser 138 may measure temperature proximate to evaporator 144, and may use the temperature measurements proximate to evaporator 144 to alter one or more operating parameters of fluid handling system 100B, e.g., to achieve a target output (e.g., temperature), to improve efficiency of operation, or the like.

Control module 180 may be configured to perform any of the methods described in connection with FIGS. 4A-B. Controllers 185 of control module 180 may receive sensor data from sensors (e.g., raw sensor data, preprocessed sensor data, average sensor data, data as a difference of a measured value from a target/threshold value, etc.). Controllers 185 may be configured to generate one or more control signals based on the input sensor data. Control signals may facilitate operation of adjustable components of fluid handling system 100B.

Fluid handling system 100B may include one or more valves with variable openings. For example, a fluid flow rate may be altered by adjusting an opening of a valve. Valves may be electronically adjustable, e.g., a valve may be an electronic expansions valve (EEV). A valve may be configured to adjust an opening of the valve (e.g., a percent open value) based on a control signal received from control module 180. Fluid handling system 100B may include one or more pumps, compressors, or the like. Pumps and compressors may be configured with variable run speeds (e.g., motor operation speed, pumping speeds, etc.). Pumps and compressors may be configured to adjust a speed of operation based on a control signal received from control module 180. Fluid handling system 100B may include motor 160 coupled to a PX of hydraulic energy transfer system 110. Motor 160 may be configured to adjust a speed of operation of the PX based on a signal received from control module 180. For example, motor 160 may act as a generator by transferring rotational energy of the PX to electrical energy.

FIGS. 2A-E are exploded perspective views of a rotary PX 40 (e.g., rotary pressure exchanger, rotary liquid piston compressor (LPC)), according to certain embodiments. Some of the features in one or more of FIGS. 2A-E may have similar properties, functions, and/or structures as those in one or more of FIGS. 1A-B.

PX 40 is configured to transfer pressure and/or work between a first fluid (e.g., refrigerant, particle free fluid, proppant free fluid, supercritical carbon dioxide, HP fluid in 130) and a second fluid (e.g., refrigerant, slurry fluid, frac fluid, superheated gaseous carbon dioxide, LP fluid in 120) with minimal mixing of the fluids. The rotary PX 40 may include a generally cylindrical body portion 42 that includes a sleeve 44 (e.g., rotor sleeve) and a rotor 46. The rotary PX 40 may also include two end caps 48 and 50 that include manifolds 52 and 54, respectively. Manifold 52 includes respective inlet port 56 and outlet port 58, while manifold 54 includes respective inlet port 60 and outlet port 62. In operation, these inlet ports 56, 60 enable the first and second fluids to enter the rotary PX 40 to exchange pressure, while the outlet ports 58, 62 enable the first and second fluids to then exit the rotary PX 40. In operation, the inlet port 56 may receive a high-pressure first fluid (e.g., HP fluid in 130) output from a condenser, and after exchanging pressure, the outlet port 58 may be used to route a low-pressure first fluid (e.g., LP fluid out 140) out of the rotary PX 40 to a receiver (e.g., flash tank) configured to receive the first fluid from the rotary PX 40. The receiver may form a chamber configured to separate the fluid into a gas and a liquid. Similarly, the inlet port 60 may receive a low-pressure second fluid (e.g., low pressure slurry fluid, LP fluid in 120) from a booster configured to receive a portion of the gas from the receiver and increase pressure of the gas, and the outlet port 62 may be used to route a high-pressure second fluid (e.g., high pressure slurry fluid, HP fluid out 150) out of the rotary PX 40. The end caps 48 and 50 include respective end covers 64 and 66 (e.g., end plates) disposed within respective manifolds 52 and 54 that enable fluid sealing contact with the rotor 46.

One or more components of the PX 40, such as the rotor 46, the end cover 64, and/or the end cover 66, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics. Additionally, in some embodiments, one or more components of the PX 40, such as the rotor 46, the end cover 64, the end cover 66, and/or other sealing surfaces of the PX 40, may include an insert. In some embodiments, the inserts may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 46 may be cylindrical and disposed in the sleeve 44, which enables the rotor 46 to rotate about the axis 68. The rotor 46 may have a plurality of channels 70 (e.g., ducts, rotor ducts) extending substantially longitudinally through the rotor 46 with openings 72 and 74 (e.g., rotor ports) at each end arranged symmetrically about the longitudinal axis 68. The openings 72 and 74 of the rotor 46 are arranged for hydraulic communication with inlet and outlet apertures 76 and 78 (e.g., end cover inlet port and end cover outlet port) and 80 and 82 (e.g., end cover inlet port and end cover outlet port) in the end covers 64 and 66, in such a manner that during rotation the channels 70 are exposed to fluid at high-pressure and fluid at low-pressure. As illustrated, the inlet and outlet apertures 76 and 78 and 80 and 82 may be designed in the form of arcs or segments of a circle (e.g., C-shaped).

In some embodiments, PX 40 may be coupled to motor 92. Motor 92 may be configured to adjust a speed of rotation of PX 40, e.g., of rotor 46. Components of PX 40 may be connected by a shaft (not shown) through the axis of rotation. The shaft may be coupled to motor 92. In some embodiments, motor 92 may act as a generator, e.g., it may transfer rotational energy of PX 40 to electrical energy. In some embodiments, motor 92 may drive PX 40, e.g., motor 92 may increase a speed of operation (e.g., rotation) of PX 40.

In some embodiments, a control module 94 may be operatively coupled to motor 92. Control module 94 may be configured to perform any methods described in connection with FIGS. 4A-B. Control module 94 may receive sensor data (e.g., revolutions per minute measured through a tachometer or optical encoder, volumetric flow rate measured through flowmeter, pressure or temperature data of fluid in the fluid handling system, etc.). Control module 94 may generate a control signal based on sensor data. Control module 94 may use the control signal to adjust operation of motor 92. Motor 92 may be utilized to control the extent of mixing between the first and second fluids in the rotary PX 40, which may be used to improve the operability of the fluid handling system (e.g., fluid handling systems 100A-B of FIGS. 1A-B). For example, varying the volumetric flow rates of the first and/or second fluids entering the rotary PX 40 allows the operator (e.g., system operator, plant operator) to control the amount of fluid mixing within the PX 40. In addition, varying the rotational speed of the rotor 46 (e.g., via motor 92) also allows the operator to control mixing. Three characteristics of the rotary PX 40 that affect mixing are: (1) the aspect ratio of the rotor channels 70; (2) the duration of exposure between the first and second fluids; and (3) the creation of a barrier (e.g., fluid barrier, piston, interface) between the first and second fluids within the rotor channels 70. First, the rotor channels 70 (e.g., ducts) are generally long and narrow, which stabilizes the flow within the rotary PX 40. In addition, the first and second fluids may move through the channels 70 in a plug flow regime with minimal axial mixing. Second, in certain embodiments, the speed of the rotor 46 reduces contact between the first and second fluids. For example, the speed of the rotor 46 (e.g., rotor speed of approximately 1200 revolutions per minute (RPM)) may reduce contact times between the first and second fluids to less than approximately 0.15 seconds, 0.10 seconds, or 0.05 seconds. Third, the rotor channel 70 (e.g., a small portion of the rotor channel 70) is used for the exchange of pressure between the first and second fluids. In some embodiments, a volume of fluid remains in the channel 70 as a barrier between the first and second fluids. All these mechanisms may limit mixing within the rotary PX 40. Moreover, in some embodiments, the rotary PX 40 may be designed to operate with internal pistons or other barriers, either complete or partial, that isolate the first and second fluids while enabling pressure transfer.

In some embodiments, control module 94 may receive sensor data indicative of pressure in a condenser of the fluid handling system. For example, a pressure gauge may measure pressure of fluid entering a condenser. Output fluid from the condenser may be coupled to a high pressure inlet of the PX. Pressure of fluid entering a condenser may be related to pressure inside the condenser. Operating speed of the PX may be adjusted (e.g., via motor 92) to maintain a target pressure in the condenser. For example, if pressure in the condenser drops below a target pressure, motor 92 may be used to inhibit rotation of PX 40, slowing flow of fluid through PX 40 and increasing the pressure of fluid in the condenser.

FIGS. 2B-2E are exploded views of an embodiment of the rotary PX 40 illustrating the sequence of positions of a single rotor channel 70 in the rotor 46 as the channel 70 rotates through a complete cycle. It is noted that FIGS. 2B-2E are simplifications of the rotary PX 40 showing one rotor channel 70, and the channel 70 is shown as having a circular cross-sectional shape. In other embodiments, the rotary PX 40 may include a plurality of channels 70 with the same or different cross-sectional shapes (e.g., circular, oval, square, rectangular, polygonal, etc.). Thus, FIGS. 2B-2E are simplifications for purposes of illustration, and other embodiments of the rotary PX 40 may have configurations different from those shown in FIGS. 2A-2E. As described in detail below, the rotary PX 40 facilitates pressure exchange between first and second fluids (e.g., a particulate-free fluid and a slurry fluid, higher pressure refrigerant and lower pressure refrigerant, etc.) by enabling the first and second fluids to briefly contact each other within the rotor 46. In some embodiments, the PX facilitates pressure exchange between first and second fluids by enabling the first and second fluids to contact opposing sides of a barrier (e.g., a reciprocating barrier, a piston, not shown). In some embodiments, this exchange happens at speeds that result in limited mixing of the first and second fluids. The speed of the pressure wave traveling through the rotor channel 70 (as soon as the channel is exposed to the aperture 76), the diffusion speeds of the fluids, and/or the rotational speed of rotor 46 may dictate whether any mixing occurs and to what extent.

FIGS. 2B-E include control module 94 coupled to PX 40. Control module 94 may be configured to perform any of the methods of FIGS. 4A-B. FIGS. 2B-E depict various stages of operation of PX 40. Operation of PX 40 may be controlled by control module 94. For example, control module 94 may be operatively coupled to a motor (e.g., motor 92). Control module 94 may send one or more control signals to the motor. The motor may adjust operation of PX 40, e.g., may adjust a speed of rotation of PX 40, a speed of rotation of PX 40, etc. Control module 94 may be operatively coupled to other components of a fluid handling system that affect operation of PX 40. For example, one or more compressors that supply fluid to PX 40 may be controlled by control module 94, one or more valves that supply fluid to PX 40 may be controlled by control module 94, etc.

FIG. 2B is an exploded perspective view of an embodiment of a rotary PX 40 (e.g., rotary LPC), according to certain embodiments. In FIG. 2B, the channel opening 72 is in a first position. In the first position, the channel opening 72 is in fluid communication with the aperture 78 in end cover 64 and therefore with the manifold 52, while the opposing channel opening 74 is in hydraulic communication with the aperture 82 in end cover 66 and by extension with the manifold 54. The rotor 46 may rotate in the clockwise direction indicated by arrow 84. In operation, low-pressure second fluid 86 (e.g., low pressure slurry fluid) passes through end cover 66 and enters the channel 70, where it contacts the first fluid 88 at a dynamic fluid interface 90. The second fluid 86 then drives the first fluid 88 out of the channel 70, through end cover 64, and out of the rotary PX 40. However, because of the short duration of contact, there is minimal mixing between the second fluid 86 (e.g., slurry fluid) and the first fluid 88 (e.g., particulate-free fluid). In some embodiments, low pressure second fluid 86 contacts a first side of a barrier (e.g., a piston, not shown) disposed in channel 70 that is in contact (e.g., on an opposing side of the barrier) by first fluid 88. The second fluid 86 drives the barrier which pushes first fluid 88 out of the channel 70. In such embodiments, there is negligible mixing between the second fluid 86 and the first fluid 88.

FIG. 2C is an exploded perspective view of an embodiment of a rotary PX 40 (e.g., rotary LPC), according to certain embodiments. In FIG. 2C, the channel 70 has rotated clockwise through an arc of approximately 90 degrees. In this position, the opening 74 (e.g., outlet) is no longer in fluid communication with the apertures 80 and 82 of end cover 66, and the opening 72 is no longer in fluid communication with the apertures 76 and 78 of end cover 64. Accordingly, the low-pressure second fluid 86 is temporarily contained within the channel 70.

FIG. 2D is an exploded perspective view of an embodiment of a rotary PX 40 (e.g., rotary LPC), according to certain embodiments. In FIG. 2D, the channel 70 has rotated through approximately 60 degrees of arc from the position shown in FIG. 2B. The opening 74 is now in fluid communication with aperture 80 in end cover 66, and the opening 72 of the channel 70 is now in fluid communication with aperture 76 of the end cover 64. In this position, high-pressure first fluid 88 enters and pressurizes the low-pressure second fluid 86, driving the second fluid 86 out of the rotor channel 70 and through the aperture 80.

FIG. 2E is an exploded perspective view of an embodiment of a rotary PX 40 (e.g., rotary LPC), according to certain embodiments. In FIG. 2E, the channel 70 has rotated through approximately 270 degrees of arc from the position shown in FIG. 2B. In this position, the opening 74 is no longer in fluid communication with the apertures 80 and 82 of end cover 66, and the opening 72 is no longer in fluid communication with the apertures 76 and 78 of end cover 64. Accordingly, the first fluid 88 is no longer pressurized and is temporarily contained within the channel 70 until the rotor 46 rotates another 90 degrees, starting the cycle over again.

FIGS. 3A-D are schematic diagrams of fluid handling systems 300A-D including PXs and one or more controllers (e.g., control system, controllers 185 of control module 180 of FIG. 1A), according to certain embodiments. Some of the features in one or more of FIGS. 3A-D may have similar properties, functions, and/or structures as those in one or more of FIGS. 1A-B and/or one or more of FIGS. 2A-E. Systems of one or more of FIGS. 3A-D may be used to perform the methods of one or more of FIGS. 4A-B.

Figure 3A:
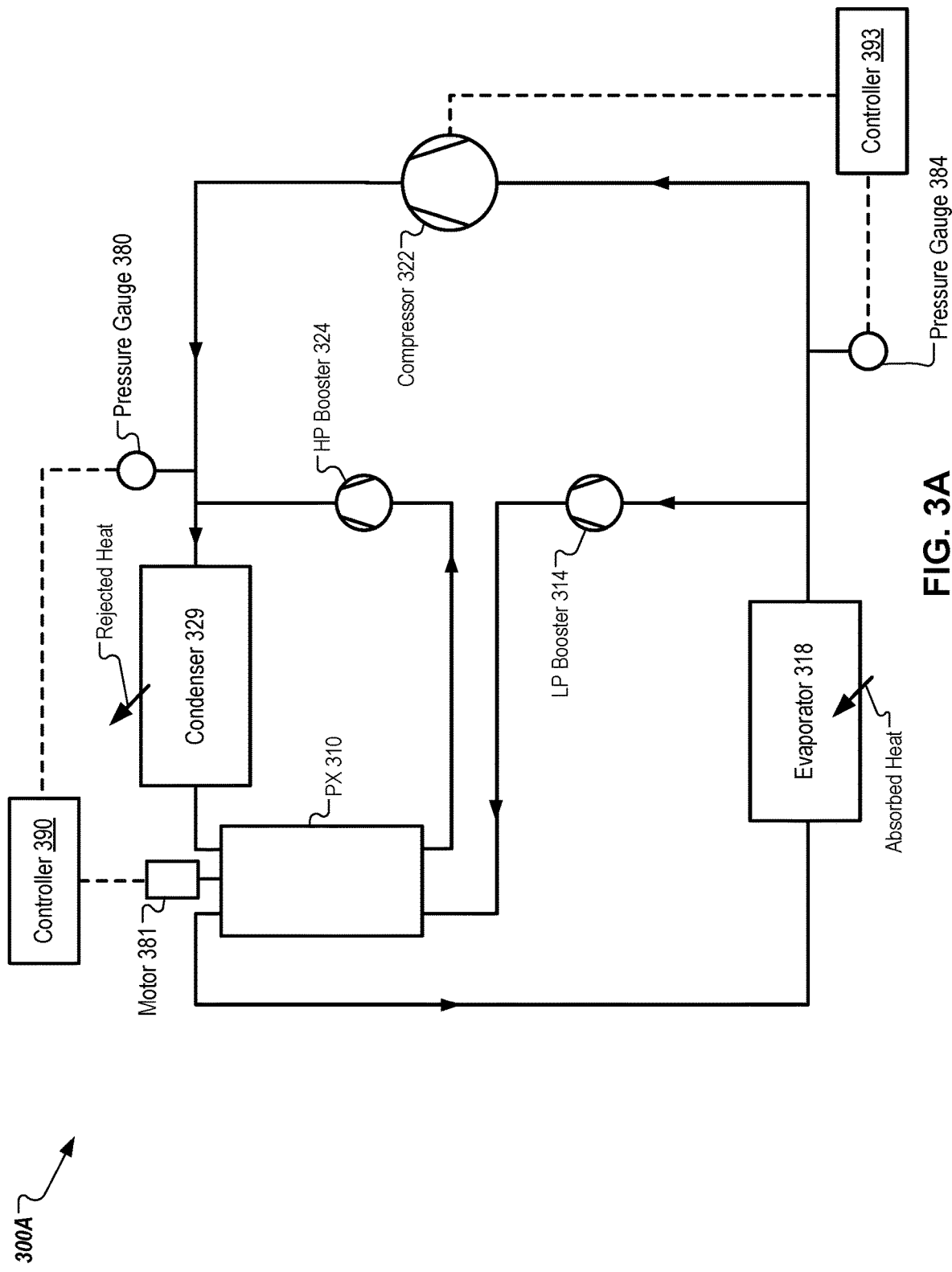
FIGS. 3A-D are schematic diagrams of fluid handling systems including PXs, according to some embodiments.
Figure 3B:
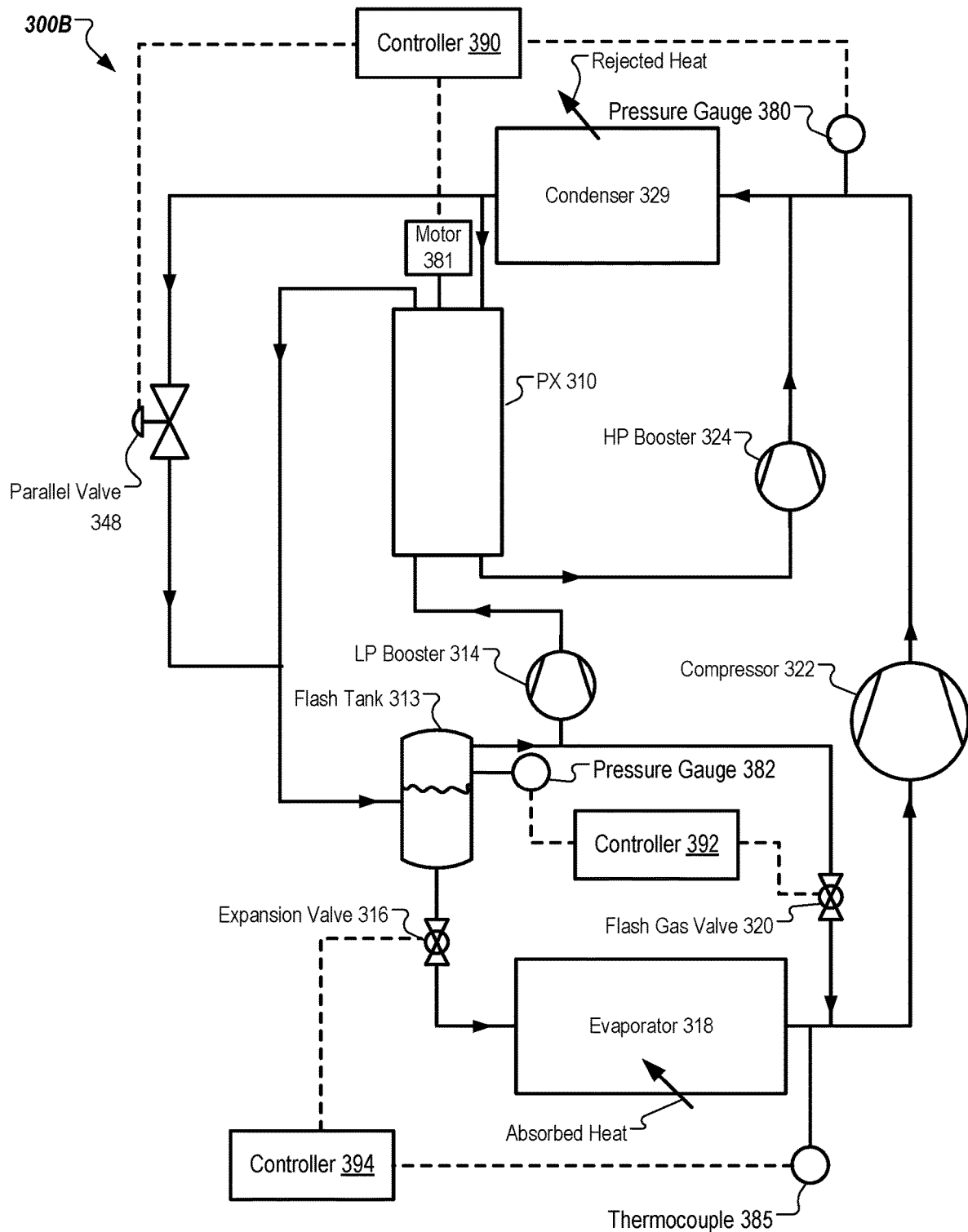

FIGS. 3A-D depict various fluid handling system architectures (fluid handling systems 300A-D) and various controllers, according to certain embodiments. The depicted architectures are example architectures, e.g., depicted architectures highlight operations of controllers of the fluid handling systems. Any of the controllers depicted in FIGS. 3A-D may be included in any combination in any architecture design of a fluid handling system. For example, a controller performing operations such as controller 393 of FIG. 3A may be included in an architecture including a parallel valve (e.g., parallel valve 348 of FIG. 3B) such as depicted in FIG. 3B, a controller performing operations such as controller 395 of FIG. 3D may be included in an architecture similar to that depicted in FIG. 3A, etc. A fluid handling system including any controller depicted herein (e.g., any controller adjusting operation of a component of a fluid handling and/or energy transfer system including a PX based on sensor data from the system), alone or in any combination, is within the scope of this disclosure. Controllers may be isolated components (e.g., each controller may be a separate device), controllers may be combined components (e.g., operations of two or more controllers may be performed by the same device, control system), etc. In some embodiments, devices of fluid handling systems 300A-D of FIGS. 3A-D may communicate via wired connections. In some embodiments, devices of fluid handling systems 300A-D may communicate wirelessly. In some embodiments, device depicted in FIGS. 3A-D may communicate via a network. For example, controllers of FIGS. 3A-D may receive sensor data via a network, and may transmit control signals via the network. In some embodiments, devices of fluid handling systems 300A-D of FIGS. 3A-D may communicate via one or more wired networks. In some embodiments, devices may communicate via one or more wireless networks (e.g., personal area networks, wireless local area networks, etc.). In some embodiments, devices of fluid handling systems 300A-D may communicate via some wired and some wireless networks.

In some embodiments, controllers of fluid handling systems 300A-D may be PID controllers. Controllers of fluid handling systems 300A-D may calculate an error value (e.g., the difference between a target set point and a measured value). Controllers of fluid handling systems 300A-D may apply a correction (e.g., generate a control signal) based on proportional, integral, and derivative terms of the error value. For example, the proportional term may be based on the difference between the set point value and the measured value, the integral term may be based on past values of the error term integrated over time, and the derivative term may be based on a predicted future trend of the error term based on the current rate of change of the error term. In some embodiments, controllers of fluid handling systems 300A-D may be computing devices. Controllers of fluid handling systems 300A-D may be implemented as software (e.g., executed by a general purpose computing device), hardware, or a combination of hardware and software. In some embodiments, operation of controllers of fluid handling systems 300A-D may include receiving one or more adjustable settings, parameters, etc. For example, the response (e.g., magnitude of output signal, value of an adjustment instruction included in a control signal, etc.) of a controller may be of variable strength (e.g., for a given difference between a measured value and a target value of a measured property, a controller may have a range of possible output values, and implementation of one of the range of outputs may be responsive to one or more settings and/or parameters of the controller). In some embodiments, a controller may have an associated lookup table, and for a given input (e.g., a difference between a set point and a measured value), the controller may produce an output in accordance with the table. In some embodiments, a controller may perform a calculation including an adjustable parameter (e.g., a user-adjustable parameter, and adjustable setting, etc.), and in response to an input, the controller may generate an output based on the input. In some embodiments, parameters and/or settings of controllers may be selected/adjusted by a user. In some embodiments, parameters and/or settings of a controller may be adjusted by a computer-implemented method, e.g., of the controller, of an associated computing device, or the like.

For example, performance of a controller may be tracked (e.g., measured and stored for analysis over time). If a controller causes overshoot (e.g., if a component of a fluid handling system over-corrects responsive to receiving a control signal from the controller, if the measured property value passes through a target value before settling within a threshold of the target value, etc.) above a threshold value (e.g., a percent of the difference between the initial value and the target value, above a threshold value of frequency and/or severity of overshoot, etc.), sensitivity of the controller (e.g., strength of response to a measurement different from a target property value) may be decreased. For example, a controller may generate a control signal responsive to receiving a measurement different from a set point (e.g., a difference between a set point and a measured value exceeding a threshold). The controller may later receive a measurement different from the set point but in the opposite direction (e.g., the control signal may have intended to correct a measured value lower than a set point, and the subsequent measurement may be higher than the set point). Responsiveness of the controller (e.g., a parameter of a calculation that determines the strength of an output relative to an input difference between a set point and a measured value, a table entry determining the severity of action instructed in a control signal based on an input from a sensor, etc.) may be adjusted to reduce the likelihood of an overshoot in future operations. Adjustment to a controller setting may be global, e.g., a parameter or table may be updated such that all future control signals are generated according to the update. Adjustment to a controller setting may not apply globally, e.g., one or more lookup table values may be adjusted while others are left unadjusted (e.g., a lookup table value associated with a range of differences between a set point and a measured value may be adjusted, a lookup table value associated with one or more differences for a range of measured values may be adjusted, etc.), a parameter for use in some situations may be updated (e.g., a list of parameters may be applied for different measured values, different set point values, different values of a difference between a measured value and a set point, etc.), or the like.

Similarly, if a controller is not sensitive enough (e.g., if property values in the system are slower to reach within a threshold value of a target value), response of the controller may be increased. For example, a controller may receive a measurement different than a set point (e.g., a controller may be configured to receive pressure measurements from a pressure gauge, and may receive a measurement that is different from a set point pressure value by at least a threshold amount). The controller may generate a control signal responsive to receiving the measurement (e.g., the controller may generate a control signal for a valve to open to adjust pressure at the pressure gauge). The controller may subsequently receive a measurement that the pressure has not reached the set point (e.g., the action taken by the valve responsive to the control signal was not sufficient to reduce the difference between the set point and the measured value below a threshold). One or more settings/parameters of the controller may be adjusted to increase the response of the controller (e.g., increase the output signal generated based on an input signal of a given strength, increase the severity of instructions included in a control signal associated with a given difference between a set point and a measured value, etc.) to an input.

In some embodiments, determining an update to the sensitivity and/or response (e.g., an update to a parameter or setting dictating the strength or severity of an output) of a controller may be performed by a machine learning model. A machine learning model may be trained with input including a target property value, a measured property value, a response of the controller (e.g., a control signal), and/or a result of a component of the system acting on an instruction received by the controller. The machine learning model, once trained, may be configured to receive as input a measured property value and a target value and generate as output an indication of an appropriate action (e.g., a control signal) to be taken by one or more components of the fluid handling system. For example, a machine learning model may be provided with historical data as training data. The machine learning model may be provided with one or more historical property values associated with a property to be corrected in a fluid handling system (e.g., one or more set point values and one or more measured values generated before and after a component of the system performs an action as instructed by a controller) as training input. The machine learning model may further be provided with historical property values after an adjustment to correct the measured property values is made (e.g., one or more measured values, measured after a control signal was generated for one or more components of the system). The machine learning model may be provided with one or more historical control signals (or data indicative of the control signals) as target output. Once trained, the machine learning model may receive as input current property values (e.g., one or more set point values, one or more measured values, etc.) and generate as output a control signal (or data associated with a control signal) that is predicted to bring the one or more measured property values within a threshold difference value of the one or more set point values.

Fluid handling systems 300A-D may be heat transfer systems. Fluid handling systems 300A-D may be refrigeration systems. Fluid handling systems 300A-D may be heat pump systems. Fluid handling systems 300A-D may be reversible heat pump systems. A reversible heat pump system may include components not picture in FIGS. 3A-D, for example, a reversing valve (e.g., a 4-way valve to reverse flow). A reversible heat pump system may reverse direction of flow of a coolant fluid in one or more portions of the fluid handling system, e.g., flow through a condenser and/or an evaporator (e.g., outdoor heat exchanging unit and/or indoor heat exchanging unit) may be reversed. A reversible heat pump system may not reverse direction of flow in one or more portions of the fluid handling system, e.g., flow through a compressor or pump may not be reversed. A reversible heat pump system may include additional flow paths, additional valves, etc., utilized for example when flow is reversed. Though additional components and flow paths associated with a reversible heat pump system are not depicted in FIGS. 3A-D, reversible heat pump systems including such components are within the scope of this disclosure.

FIG. 3A is a schematic diagram of a fluid handling system 300A including a PX 310 and controllers 390 and 393, according to some embodiments. PX 310 may be a rotary pressure exchanger. In some embodiments, PX 310 is an isobaric or substantially isobaric pressure exchanger. PX 310 may be configured to exchange pressure between a first fluid and a second fluid. In some embodiments, PX 310 is coupled to a motor 381 (e.g., rotation of a rotor of PX 310 is controlled and/or adjusted by motor 381). In some embodiments, a controller (e.g., controller 390, controller 393) receives sensor data from one or more sensors. Controllers may receive sensor data from one or more sensors and generate one or more control signals based on the received sensor data. In some embodiments, mass flow (e.g., of the first fluid, of the second fluid, etc.) through PX 310 may be related to a speed of operation of PX 310 (e.g., a speed of rotation of a rotor of a rotary PX). In some embodiments, pressure of fluid (e.g., the first fluid, the second fluid, etc.) in various components of a fluid handling system (e.g., fluid handling systems 300A-D) may be related to a speed of operation of PX 310.

In some embodiments, PX 310 is configured to receive the first fluid at a high pressure (e.g., HP fluid in 130 of FIGS. 1A-B) via a high pressure inlet. In some embodiments, PX 310 is configured to receive the second fluid at a low pressure (e.g., LP fluid in 120 of FIGS. 1A-B) via a low pressure inlet. Although there is a reference to "high pressure" and "low pressure," "high pressure" and "low pressure" may be relative to one another and may not connote certain pressure values (e.g., the pressure of the HP fluid in 130 is higher than the pressure of LP fluid in 120). PX 310 may exchange pressure between the first fluid and the second fluid. PX 310 may provide the first fluid via a low pressure outlet (e.g., LP fluid out 140) and may provide the second fluid via a high pressure outlet (e.g., HP fluid out 150). In some embodiments, the first fluid provided via the low pressure outlet is at a low pressure and the second fluid provided via the high pressure outlet is at a high pressure. PX 310 may act as a high pressure expansion valve, e.g., fluid flow through PX 310 (e.g., from a high pressure inlet to a low pressure outlet) may expand. PX 310 may transfer pressure from one fluid stream to another, increasing the pressure of one fluid stream. PX 310 may act as both an isentropic (or substantially isentropic) expansion device and a compressor, which may cause transfer of heat, may facilitate one or more operations of a refrigeration cycle, or the like. The compression process of PX 310 may be substantially isenthalpic.

In some embodiments, the first fluid may be a refrigerant fluid in a supercritical state (e.g., supercritical $CO_2$). In some embodiments, the first fluid may be a refrigerant fluid in a liquid state (e.g., liquid $CO_2$). In some embodiments, the second fluid may be a refrigerant fluid in a gaseous state (e.g., gaseous $CO_2$). In some embodiments, the second fluid may be a refrigerant fluid in a two-phase mixture (e.g., a liquid-gas mixture of $CO_2$). In some embodiments, the second fluid may be a refrigerant fluid in a liquid state (e.g., liquid $CO_2$).

In some embodiments, fluid handling system 300A includes a condenser 329, an evaporator 318, and a compressor 322. In some embodiments, condenser 329 may act as a gas cooler, e.g., the fluid handling system may be operated at pressured and temperatures wherein fluid does not actually condense in condenser 329. Any embodiment discussed herein may include a condenser that may act as a gas cooler in one or more applications. In some embodiments, e.g., above the critical point of a fluid, the thermodynamic distinction between gas and liquid of a fluid disappears, and fluid (e.g., fluid in a condenser) may exist in a super critical state (e.g., both input and output fluid of a condenser may be in a supercritical state, on of input or output fluid of a condenser may be in a supercritical state, neither fluids may be in a supercritical state, etc.). In some embodiments, fluid handling system 300A is a refrigeration system. For example, evaporator 318 may facilitate absorption of heat by system 300A from a heat source (e.g., a refrigerated area, a cold reservoir, etc.) to a refrigeration fluid. The heat may be rejected to a heat sink (e.g., the environment, a hot reservoir, etc.) via the condenser 329. In some embodiments, the refrigeration fluid facilitates heat transfer from an environment associated with the evaporator 318 to an environment associated with the condenser 329. Compressor 322 of fluid handling system 300A may increase corresponding pressure of the refrigeration fluid along a flow path between the evaporator 318 and the condenser 329. In some embodiments, the refrigeration fluid is $CO_2$ or another refrigeration fluid. The refrigeration fluid may flow substantially in a cycle (e.g., from condenser 329 to PX 310 to evaporator 318 to compressor 322 to condenser 329, etc.).

In some embodiments, fluid handling system 300A is a heat pump system. For example, heat may be rejected by fluid at condenser 329 into a target region to be heated (e.g., for heating the interior space of a building). Heat may be absorbed from the environment by the fluid of fluid handling system 300A at evaporator 318 for transfer to the environment of condenser 329. In some embodiments, fluid handling system 300A may be a reversible heat pump.

In some embodiments, fluid handling system 300A includes a low-pressure booster (e.g., LP booster 314) and/or a high-pressure booster (e.g., HP booster 324). Both LP booster 314 and HP booster 324 may be configured to increase (e.g., "boost") pressure of the second fluid. For instance, LP booster 314 may increase pressure of the first fluid output from evaporator 318 (e.g., evaporator 318 may receive a low-pressure second fluid from the PX 310 and output a fluid to LP booster 314). HP booster 324 may increase pressure of the second fluid output by the PX 310. The second fluid may be provided (e.g., by HP booster 324) to combine with fluid output from compressor 322 (e.g., upstream of an inlet of the condenser 329) to be provided to the condenser 329. LP booster 314 may be configured to increase pressure less than a threshold value (e.g., LP booster 314 may operate over a pressure differential that is less than a threshold amount, fluid handling system 300A may transfer pressure via PX 310 to reduce pressure differential at LP booster 314, etc.). For example, LP booster 314 may increase pressure of the second fluid by approximately 10-100 psi, by approximately 30-80 psi, by approximately 40-60 psi, by approximately 50 psi, by any range contained therein, etc. The second fluid may experience pressure loss (e.g., parasitic loss) as the second fluid flows from the LP booster 314 to the second inlet (e.g., low pressure inlet) of the PX 310. LP booster 314 may be configured to increase pressure of fluid to a target value, e.g., a value chosen for system operation, a value associated with another pressure in the system (e.g., pressure of a fluid associated with a low pressure outlet of the PX).

HP booster 324 may increase pressure of the second fluid between the second outlet of the PX 310 and an inlet of the condenser 329. HP booster 324 may increase pressure less than a threshold value (e.g., HP booster 324 may operate over a small pressure differential). For example, HP booster 324 may increase pressure of the second fluid by approximately 10-100 psi, by approximately 30-80 psi, by approximately 40-60 psi, by approximately 50 psi, by any range contained therein, etc. HP booster 324 may increase pressure of the second fluid to the inlet pressure of the condenser 329 (e.g., the pressure of condenser 329). HP booster 324 may increase the pressure of a fluid to a target value (e.g., a value chosen for system operation, a measured pressure value to match output of compressor 322, or the like). In some embodiments, HP booster 324 may be coupled between condenser 329 and PX 310 (not shown). In some embodiments, fluid exiting the condenser 329 is in a liquid state. Thus, in some embodiments, HP booster 324 pumps liquid from the outlet of condenser 329 (e.g., liquid discharged from condenser 329) to the high pressure inlet of the PX 310. The HP booster 324 may increase the pressure of the liquid output from the condenser 329 to the high pressure inlet of the PX 310.

In some embodiments, compressor 322 increases pressure of fluid more than a threshold amount (e.g., compressor 322 may operate over a pressure differential that is greater than a threshold amount, that is greater than the pressure differential LP booster 314 operates over, that is greater than the pressure differential HP booster 324, or the like). For example, compressor 322 may increase pressure of the fluid by approximately 100-1200 psi, by approximately 500-1100 psi, by approximately 800-1000 psi, by approximately 900 psi, by at least 100 psi, by at least 500 psi, any included range, or the like.

Fluid handling system 300A may include one or more sensors. The one or more sensors measure property values associated with the system. For example, one or more temperature sensors may measure temperature of a flowing fluid, of the environment, of hot and/or cold sinks associated with the system, etc. One or more pressure gauges may measure pressure of a fluid of fluid handling system 300A. One or more flow meters may measure flow (e.g., mass flow) of fluid through fluid handling system 300A. One or more density meters (e.g., two phase fluid density meters, two phase density meters, etc.) may measure density of a fluid of fluid handling system 300A. Other sensors (e.g., meters) may measure additional property values, e.g., work performed by various components, heat flow through the system, power consumed by components of the system, etc. Depicted in FIG. 3A are pressure gauge 380 and pressure gauge 384.

Fluid handling system 300A includes controllers 390 and 393. Controllers of fluid handling system 300A may be PID controllers. Controller 390 is operatively coupled to motor 381 of PX 310. Controller 390 may receive one or more measurements from pressure gauge 380. Controller 390 may receive measurements as raw measurement data, as preprocessed measurement data, as averaged (e.g., boxcar averaged) measurement data, or the like. In some embodiments, controller 390 may receive additional measurement data, e.g., from one or more other sensors associated with fluid handling system 300A. Controller 390 may receive sensor data from motor 381, e.g., data indicative of a speed of rotation of motor 381, data indicative of a speed of operation of PX 310, etc. Controller 390 may be configured to generate one or more control signals based on received measurement data.

Motor 381 may be configured to adjust operation of PX 310 (e.g., by adjusting a speed of operation of motor 381) responsive to receiving a control signal from controller 390. Pressure gauge 380 may provide an indication of pressure of fluid in condenser 329. Controller 390 may generate a control signal directed at achieving and/or maintaining a target pressure of condenser 329. For example, increasing a speed of operation of PX 310 may increase a flow rate of fluid through PX 310. Increasing a speed of operation of PX 310 may decrease fluid pressure of condenser 329, a pressure measured by pressure gauge 380, etc.

In some embodiments, a target pressure of condenser 329 may be chosen to maximize heat transfer of the system, maximize heat transfer between condenser 329 and the environment, maximize energy efficiency of the system, maximize a coefficient of performance (COP, e.g., a ratio between heat transferred by the system and power expended by pumps/compressors of the system), or the like.

In some embodiments, motor 381 may act to operate, actuate, or accelerate PX 310. For example, motor 381 may drive PX 310. Motor 381 may draw power from a power source to drive PX 310. In some embodiments, motor 381 may act like a generator. For example, PX 310 may be driven by fluid of fluid handling system 300A (e.g., driven by a pressure differential in the fluid, driven by one or more pumps and/or compressors of the system, etc.). Motor 381 may impart additional resistance to operation of PX 310 (e.g., resistance to rotation of a rotor of a rotary PX), which may cause a speed of operation of PX 310 to decrease. Motor 381 may generate electrical power (e.g., may convert rotational energy of PX 310 into electrical energy).

Controller 393 is operatively coupled to compressor 322. Controller 393 may be configured to receive measurement data from pressure gauge 384. Controller 393 may additionally receive data (e.g., measurement data) from one or more other sources (e.g., additional sensors not shown in FIG. 3A). Controller 393 may be configured to generate a control signal for compressor 322 based on received measurement data. Measurement data associated with controller 393 may share one or more features with measurement data associated with controller 390. In some embodiments, pressure gauge 384 may generate measurement data indicative of suction pressure of compressor 322 (e.g., a pressure of a fluid input to compressor 322).

In some embodiments, a target pressure of fluid input to compressor 322 may be maintained (e.g., by one or more controllers). Flow of fluid through the system may vary, e.g., due to fluctuating temperature of the environment, control of various components, or the like. Controller 393 may send a control signal to compressor 322 to maintain an input pressure to compressor 322 accounting for such fluctuations. For example, compressor 322 may be configured to adjust a pumping speed of compressor 322 responsive to receiving a control signal from controller 393. Adjusting a pumping speed of compressor 322 may adjust an inlet pressure of compressor 322 (e.g., a pressure measured by pressure gauge 384).

In some embodiments, additional controllers may be included in fluid handling system 300A. In some embodiments, a controller controls a flowrate of fluid through the PX 310 by controlling a flowrate of LP booster 314. For example, a controller may set a flowrate of LP booster 314 to control a flowrate of first fluid through the PX 310. A controller may control a flowrate of HP booster 324 by sending one or more control signals to HP booster 324. Additional controllers (e.g., not shown in FIG. 3A) may share features with controllers 390 and 393, e.g., they may receive sensor data, may generate a control signal for one or more components, may target property values at sensor locations, etc.

In some embodiments, a controller (e.g., a central controller, a system controller, which may be combined with one or more of controllers 390 and 393) receives sensor data indicative of a temperature of a refrigerated space (e.g., the cold reservoir proximate evaporator 318) and/or a temperature of a heated space (e.g., the hot reservoir proximate condenser 329). The controller may control LP booster 314, HP booster 324, and/or compressor 322 based on sensor data received from one or more sensors of the fluid handling system 300A (e.g., one or more fluid flowrate sensors, temperature sensors, pressure sensors, etc.). In some embodiments, one or more sensors (e.g., pressure sensors, flow sensors, temperature sensors, etc.) are disposed proximate inlets and/or outlets of the various components of the fluid handling system 300A (e.g., fluids discharged from various components). In some embodiments, one or more sensors are disposed internal to the components of the fluid handling system 300A. In some embodiments, a pressure sensor may be disposed proximate the inlet of the compressor 322 and an additional pressure sensor may be disposed proximate the outlet of the compressor 322. In some embodiments, a temperature sensor may be disposed proximate the inlet of the evaporator 318 and another temperature sensor may be disposed proximate the outlet of the evaporator 318 (e.g., for measuring temperature of fluid discharged from evaporator 318). In some embodiments, a temperature sensor may be disposed internal to the condenser 329. In some embodiments, a flow sensor may be located at each of the inlets and outlets of the PX 310 to measure a flow of the first fluid and the second fluid into and out of the PX 310.

In some embodiments, evaporator 318 is a heat exchanger to provide corresponding thermal energy from an environment (e.g., a medium of an environment) to a fluid of fluid handling system 300A. For example, evaporator 318 may receive heat (e.g., thermal energy) from air of the environment and provide the heat to the fluid. In some embodiments, the environment is a refrigerated space such as the inside of a refrigerator or freezer, an interior space (e.g., of a building or vehicle), or any other space that is to be kept cool. For example, the environment can be the interior of a freezer or refrigeration section at a supermarket or warehouse. In some embodiments, evaporator 318 may absorb heat from the environment to be provided to condenser 329, e.g., heating the region around condenser 329 may be a target outcome of fluid handling system 300A.

In some embodiments, fluid handling system 300A may include a secondary evaporator. Fluid handling system 300A may further include secondary components corresponding to any components of evaporator 318, e.g., input and output lines, valves, gauges, controllers, etc. In some embodiments, the secondary evaporator receives a portion of flow of fluid directed to evaporator 318. For example, the secondary evaporator may receive a portion of the flow from the low pressure outlet of PX 310. In some embodiments, a secondary evaporator may target a different temperature than evaporator 318 (e.g., the evaporators may be associated with refrigeration systems with different target temperatures, such as a refrigerator and freezer). In some embodiments, the two evaporators (e.g., evaporator 318 and the secondary evaporator) may be operated at different fluid pressures. Fluid output by one or more of the secondary evaporators may be directed to one or more components (e.g., valves, expansions valves, pumps, compressors, or the like) to alter the pressure of the output fluid such that the pressures are substantially similar when the output streams of the two evaporators are combined.

In some embodiments, condenser 329 is a heat exchanger to provide thermal energy from the fluid of fluid handling system 300A to another environment. For example, condenser 329 may reject heat (e.g., thermal energy) to air of an outside (e.g., exterior) environment. In some embodiments, the condenser 329 exchanges thermal energy (e.g., rejects heat) to an outside space. For example, condenser 329 may be placed outside a supermarket or warehouse building (e.g., on a roof of the building) and reject heat to the outside environment. In another example, condenser 329 may be placed in the ground and facilitate the transfer of thermal energy between the fluid and the ground. In some embodiments, condenser 329 rejects heat to an interior space while evaporator 318 absorbs heat from an exterior space (e.g., as in a heat pump configuration that is providing heating to the interior space). Thermal energy rejected from the condenser 329 may be used to heat an enclosed (e.g., substantially enclosed) space.

In some embodiments, fluid handling system 300A may include an auxiliary condenser (not shown). In some embodiments, the auxiliary condenser receives the second fluid from the high pressure outlet of PX 310, and condenser 329 receives output from compressor 322. In some embodiments, the auxiliary condenser is a heat exchanger that exchanges thermal energy (e.g., heat) between the second fluid and a medium of an environment. In some embodiments, the auxiliary condenser exchanges thermal energy between the second fluid and the same environment with which the condenser 329 exchanges thermal energy. In other embodiments, the auxiliary condenser exchanges thermal energy between the second fluid and a different environment with which the condenser 329 exchanges thermal energy. In some embodiments, the auxiliary condenser operates at a temperature different than condenser 329.

Fluid handling system 300A may include one or more ejectors. An ejector may be a device that is configured to increase pressure of a low pressure stream by using a high pressure stream. An ejector may use a converging nozzle to increase fluid velocity to transform high static pressure into velocity pressure. Including ejectors in fluid handling system 300A may allow for the utilization of high pressure fluid to increase pressure of low pressure fluid without pumps or compressors, thus reducing energy consumption and increasing efficiency of the system. Ejectors may be included, for example, to utilize high pressure fluid output from compressor 322 to pressurize fluid output by a high pressure outlet of PX 310 (e.g., augmenting or replacing HP booster 324), to utilize high pressure fluid output from compressor 322 to pressurize fluid output by a low pressure outlet of PX 310 (e.g., augmenting or replacing LP booster 314), etc.

Described herein are references to "first fluid" and "second fluid." In some embodiments, the first fluid and the second fluid are the same type of fluid (e.g., are a refrigeration fluid flowing in a fluid handling system). "First fluid" may refer to fluid flowing through the PX 310 from the high pressure inlet to the low pressure outlet of the PX 310 and/or fluid flowing to or from the high pressure inlet and/or the low pressure outlet of the PX 310. "Second fluid" may refer to fluid flowing through the PX 310 from the low pressure inlet to the high pressure outlet of the PX 310 and/or fluid flowing to or from the low pressure inlet and/or the high pressure outlet of the PX 310.

In some embodiments, system 300A is a heat pump system capable of heating and cooling an environment (e.g., an indoor space). One of condenser 329 or evaporator 318 is an outdoor unit and the other of condenser 329 or evaporator 318 is an indoor unit. In some examples, condenser 329 is the outdoor unit (e.g., condensing unit) and evaporator 318 is the indoor unit (e.g., disposed in the air handler). The flow of fluid through the condenser 329 and the evaporator 318 may be reversible (e.g., via a reversing valve coupled to the compressor 322). The reversing valve may cause fluid flow exiting the compressor 322 to be switchable between being directed towards the inlet of condenser 329 (e.g., outdoor unit) or towards the inlet of the evaporator 318 (e.g., indoor unit). In some embodiments, one or more valves and piping may be used to cause fluid flow to be directed in the same direction through all of the components (e.g., one or more the PX 310, LP booster 314, HP booster 324, compressor 322, and/or the like) while reversing fluid flow through the condenser 329 and evaporator 318.

The transfer of thermal energy (e.g., heat transfer) of the system 300A may be reversible in some embodiments. For example, in some implementations of system 300A, the condenser 329 can absorb heat (e.g., provide corresponding thermal energy from the corresponding environment to the refrigeration fluid) and the evaporator 318 can reject heat (e.g., provide corresponding thermal energy from the refrigeration fluid to the corresponding environment). Thus, in some embodiments, condenser 329 can be an evaporator (e.g., a single component may operate in some modes as an evaporator and some modes as a condenser) and evaporator 318 can be a condenser (e.g., a single component may operate in some modes as a condenser and some modes as an evaporator). In some embodiments, system 300A includes one or more valves (e.g., a reversing valve, diversion valve(s), etc.) to reverse the function of system 300A (e.g., reverse the flow of thermal energy facilitated by system 300A). In some embodiments, one or more flows of refrigeration fluid (e.g., to/from the PX 310, to/from the HP booster 324, to/from the LP booster 314, to/from the compressor 322, to/from the condenser 329, and/or to/from the evaporator 318) may be reversed and/or diverted. For example, in some embodiments, one or more reversing or diversion valves included in system 300A in some embodiments can direct fluid from the compressor 322 toward the evaporator 318. Similar valves may direct fluid from the condenser 329 toward the compressor 322.

Reversibility of system 300A may be controlled (e.g., via one or more controllers, via a programmable thermostat disposed in the indoor space, via user input, etc.). For example, a controller may determine (e.g., based on temperature data, based on user input, based on a schedule) whether to use system 300A to heat an indoor space or to cool an indoor space. In some embodiments, a controller may cause one or more valves (e.g., reversing valve, diversion valve(s), etc.) to actuate to cause fluid flow through condenser 329 and evaporator 318 to reverse. For example, a controller may cause a valve to actuate to cause refrigeration fluid to flow from the compressor 322 to the evaporator 318. In such embodiments, the evaporator 318 may act as a condenser (e.g., the refrigeration fluid may condense inside the evaporator 318) and the evaporator 318 may provide corresponding thermal energy from the refrigeration fluid to the corresponding environment (e.g., the evaporator 318 may reject heat). In some examples, a controller may cause a valve to actuate to cause refrigeration fluid to flow from the condenser 329 to the compressor 322. In such embodiments, the condenser 329 may act as an evaporator (e.g., the refrigeration fluid may evaporate inside the condenser 329) and the condenser 329 may provide corresponding thermal energy from the corresponding environment to the refrigeration fluid (e.g., the condenser 329 may absorb heat). In embodiments where the function of system 300A is reversible (e.g., reversible between heating and cooling an indoor space), evaporator 318 may be an interior heat exchanger (e.g., disposed within an interior space, disposed in an air handler system providing airflow to an indoor space) and the condenser 329 may be an exterior heat exchanger (e.g., disposed outside the interior space). Any system of the present disclosure may be a reversible system, e.g., may be a heat pump capable of heating and cooling an interior space.

In some embodiments, a system described herein is a heat pump system capable of heating an environment (e.g., an indoor space). In such a heat pump system, the condenser 329 is placed indoors and the evaporator 318 is placed outdoors. In a heat pump system, the evaporator absorbs heat from the ambient and vaporize the two phase refrigerant fluid flowing through the evaporator before sending it to the inlet of the compressor. In some embodiments, to switch from refrigeration or air-cooling system to a heat pump system, a reversing valve may be used to cause the fluid flow exiting the compressor 322 to be switchable between being directed towards the inlet of the outdoor unit or towards the inlet of the indoor unit. In some embodiments, one or more valves and piping may be used to cause fluid flow to be directed in the same direction through all of the components (e.g., one or more the PX 310, LP booster 314, HP booster 324, compressor 322, and/or the like) while switching the fluid flow from indoor unit to outdoor unit.

The direction of transfer of thermal energy (e.g., heat transfer) of the system 300A may be reversible in some embodiments. For example, in refrigeration/air-conditioning/air cooling implementations of system 300A, the condenser 329 placed outdoors rejects heat (e.g., provide corresponding thermal energy from the refrigeration fluid to the corresponding environment) and the evaporator 318 can absorbs heat (e.g., provide corresponding thermal energy from the corresponding environment to the refrigeration fluid). While in heat pump implementation of system 300A, the condenser 329 placed indoors rejects heat to its indoor environment and evaporator 318 absorbs heat from its outdoor environment. In some embodiments, system 300A includes one or more valves (e.g., a reversing valve, diversion valve(s), etc.) to reverse the function of system 300A (e.g., reverse the flow of thermal energy facilitated by system 300A). In some embodiments, one or more flows of refrigeration fluid (e.g., to/from the PX 310, to/from the HP booster 324, to/from the LP booster 314, to/from the compressor 322, to/from the condenser 329, and/or to/from the evaporator 318) may be reversed and/or diverted. In some examples, one or more reversing or diversion valves included in system 300A in some embodiments can direct fluid from the compressor 322 toward the outdoor unit. Similar valves may direct fluid from the compressor 322 to the indoor unit.

Reversibility of system 300A may be controlled (e.g., via controller 380, via a programmable thermostat disposed in the indoor space, via user input, etc.). In some examples, the controller 380 may determine (e.g., based on temperature data, based on user input, based on a schedule) whether to use system 300A to heat an indoor space or to cool an indoor space. In some embodiments, the controller 380 may cause one or more valves (e.g., reversing valve, diversion valve(s), etc.) to actuate to cause fluid flow through the system to reverse. In embodiments where the function of system 300A is reversible (e.g., reversible between heating and cooling an indoor space), evaporator 318 may be an interior heat exchanger (e.g., disposed within an interior space, disposed in an air handler system providing airflow to an indoor space) and the condenser 329 may be an exterior heat exchanger (e.g., disposed outside the interior space). In other embodiments the evaporator 318 may be an outdoor heat exchanger and condenser 329 may be an indoor heat exchanger.

In some embodiments, the systems described herein (e.g., systems of one or more of FIGS. 3A-D) can be used to heat an interior and/or enclosed space, to cool an interior and/or enclosed space, and/or selectively (e.g., reversibly) heat and cool a space.

FIG. 3B is a schematic diagram of a fluid handling system 300B that includes a pressure exchanger (PX) according to some embodiments. In some embodiments, features that have reference numbers that are similar to reference numbers in other figures include similar properties, structures, and/or functionality as those described in other figures. In some embodiments, optional components described in connection with FIG. 3A (e.g., secondary evaporator, auxiliary condenser, etc.) may also be optional components for fluid handling system 300B. In some examples, features of fluid handling system 300B have similar properties, structures, and/or functionality as fluid handling system 300A of FIG. 3A.

Fluid handling system 300B may include a parallel valve 348. Parallel valve 348 may be an expansion valve or a flow control valve. In some embodiments, parallel valve 348 selectively regulates a flow of fluid from the outlet of condenser 329 (e.g., fluid discharged by condenser 329) to flash tank 313 (e.g., receiver) in parallel with the PX 310. In some embodiments, parallel valve 348 can be actuated to selectively regulate the flow of fluid. Parallel valve 348 may selectively provide a portion of fluid output by the condenser 329 to the flash tank 313. For example, parallel valve 348 can be actuated to be further opened to flow more fluid from the condenser 329 to the flash tank 313, or parallel valve 348 can be actuated to be further closed to flow less fluid from the condenser 329 to the flash tank 313 The fluid may expand as the fluid flows through the parallel valve 348, causing a decrease in pressure and/or temperature of the fluid. In some embodiments, controller 390 may cause the parallel valve 348 to actuate (e.g., open or close) based on sensor data received from one or more sensors of fluid handling system 300B.

In some embodiments, condenser 329 may act as a gas cooler, e.g., the fluid handling system may be operated at pressured and temperatures wherein fluid does not actually condense in condenser 329. Any embodiment discussed herein may include a condenser that may act as a gas cooler in one or more applications.

Fluid handling system 300B may include a flash tank 313 (e.g., receiver). In some embodiments, flash tank 313 is a receiver configured to receive a flow of fluid (e.g., first fluid) output from the low pressure outlet of the PX 310. Flash tank 313 may form a chamber to collect the first fluid from the first outlet of the PX 310. Flash tank 313 may receive the first fluid in a two-phase state (e.g., liquid and gas), transcritical fluid, supercritical fluid, subcritical fluid, and/or combinations thereof. In some embodiments, flash tank 313 is a tank constructed of welded sheet metal. Flash tank 313 may include one or more flash tank inlets for receiving fluid and one or more flash tank outlets for discharging fluid (e.g., a gas outlet and a liquid outlet). The first fluid (at a low pressure) may separate into gas and liquid inside the flash tank 313 (e.g., indicated by the liquid surface depicted in FIG. 3B). The liquid of the first fluid may settle in the bottom of the flash tank 313 while the gas of the first fluid may rise to the top of the flash tank 313. The liquid may flow from flash tank 313 towards evaporator 318 (e.g., via expansion valve 316). The chamber of flash tank 313 may be maintained at a set pressure. The pressure may be set by a user (e.g., an operator, a technician, an engineer, etc.) and/or by a controller. In some embodiments, the pressure of the flash tank 313 is controlled by one or more valves (e.g., expansion valve 316, flash gas valve 320, a pressure regulator valve, a safety valve, etc.). In some embodiments, the flash tank 313 includes at least one pressure sensor (e.g., pressure transducer), e.g., pressure gauge 382. In some embodiments, a liquid level of flash tank 313 may be monitored (e.g., to prevent liquid from being routed to LP booster 314).

Fluid handling system 300B may include an expansion valve 316. In some embodiments, expansion valve 316 is disposed along a flow path between flash tank 313 and evaporator 318, e.g., coupled between flash tank 313 and evaporator 318. Expansion valve 316 may be an adjustable valve (e.g., an electronic expansion valve, a thermostatic expansions valve, a ball valve, a gate valve, a poppet valve, etc.). Expansion valve 316 may be controllable by a user (e.g., a technician, an operator, an engineer, etc.) or by a controller (e.g., controller 394). In some embodiments, the expansion valve 316 is caused to actuate by a controller based on sensor data (e.g., pressure sensor data, flowrate sensor data, temperature sensor data, etc.). In some embodiments, expansion valve 316 is a thermal expansion valve. Expansion valve 316 may actuate (e.g., open and/or close) based on temperature data associated with the evaporator 318 (e.g., temperature of liquid in the evaporator, temperature of gas in the evaporator, temperature of fluid entering the evaporator, temperature of fluid exiting the evaporator, etc.). For example, a pressure-sensitive component (e.g., sensing bulb) of the expansion valve 316 may increase or decrease pressure on a diaphragm of the expansion valve 316, causing a poppet valve coupled to the diaphragm to open or close, thus causing more or less flow of fluid to the evaporator 318, causing more or less expansion of the fluid. The pressure-sensitive component of the expansion valve may be positioned proximate to the downstream end of the evaporator 318 (e.g., proximate the outlet of the evaporator 318, outside evaporator 318, inside evaporator 318, or the like) and may be fluidly coupled to the diaphragm via a fluid line (e.g., a sensing capillary). In some embodiments, expansion valve 316 is controlled and actuated entirely based on electronic commands (e.g., from controller 394).

Fluid handling system 300B may include a flash gas valve 320 to regulate a flow of gas on a flash gas bypass flow path. In some embodiments, flash gas valve 320 is a bypass valve that regulates a flow of gas from a gas outlet of the flash tank 313 to be combined with output of the evaporator 318. In some embodiments, the flow of gas from the flash tank 313 flows along the flash gas bypass flow path to bypass the evaporator 318. In some embodiments, the flash gas flow path is between flash tank 313 and a location downstream of an outlet of the evaporator 318. The gas flowing along the flash gas bypass flow path may be combined with output of the evaporator 318. The flash gas valve 320 may cause gas collected in the flash tank 313 to expand (e.g., decrease in pressure) as the gas flows toward the compressor 322. The flash gas valve 320 may, in some embodiments, be an adjustable valve. In some embodiments, the flash gas valve 320 is caused to actuate by controller 392 based on sensor data.

In some embodiments, such as illustrated in FIG. 3B, LP booster 314 receives a flow of fluid from flash tank 313. In some embodiments, LP booster 314 receives a flow of gas from flash tank 313. For example, LP booster 314 receives a portion of the gas flowing along the flash gas bypass flow path between flash tank 313 and the flash gas valve 320. In some embodiments, the LP booster 314 receives the fluid and increases pressure of the fluid to form the second fluid (e.g., at the second pressure). The fluid is provided at the increased pressure (e.g., second pressure) to the second inlet of the PX 310 as the second fluid. In some embodiments, LP booster 314 is a compressor or pump that operates over a low pressure differential to "boost" the pressure of the gas received from flash tank 313. In some embodiments, the HP booster 324 is a compressor or pump that operates over a low pressure differential to "boost" the pressure of the fluid received from the second outlet of the PX.

Fluid handling system 300B may include a parallel compressor. In some embodiments, a parallel compressor receives gas from flash tank 313 (e.g., gas output of flash tank 313 may be provided to LP booster 314 and the parallel compressor, while gas output of flash tank 313 is provided to LP booster 314 and the output path of evaporator 318 as depicted in FIG. 3B). The parallel compressor may receive gas diverted from the flash gas bypass flow path (e.g., an architecture may include flash gas valve 320 and one or more parallel compressors). The parallel compressor may operate in parallel with compressor 322. The parallel compressor may increase pressure of the gas received from flash tank 313 to a higher pressure (e.g., the pressure internal to the condenser 329, to prepare the fluid to be mixed without output from compressor 322 and/or HP booster 324, etc.). The parallel compressor may provide compressed gas to be combined with output of the compressor 322. The parallel compressor may receive excess fluid output from flash tank 313, e.g., fluid flow which exceeds the flow capacity of PX 310. The parallel compressor may be a rotary compressor, a reciprocating compressor, or the like.

The LP booster 314 of fluid handling system 300B may receive fluid via one or more of multiple alternate supply lines. For example, in some embodiments LP booster 314 may receive gas output of flash tank 313, and in some embodiments LP booster 314 may receive gas output of evaporator 318 (not shown). An LP suction line may route fluid from the flash gas bypass flow path (e.g., between the flash tank 313 and the flash gas valve 320) to the LP booster 314. Another LP suction line may route fluid output by the evaporator and/or the flash gas bypass (e.g., downstream of the outlet of the evaporator 318) to the LP booster 314. In some embodiments, fluid handling system 300B may include a valve for switching between two or more LP suction lines. In some embodiments, the valve for selecting an LP suction line may be controlled electronically. In some embodiments, the valve may be controlled by a controller, by user input, or the like. In some embodiments, a controller may generate a control signal based on measurement data received by the controller from one or more sensors of fluid handling system 300B. In some embodiments, fluid received via an LP suction line coupled to output of evaporator 318 (e.g., by the LP booster 314) is at a pressure lower than gas received via an LP suction line coupled to a gas output of flash tank 313 (e.g., because the gas is received downstream of flash gas valve 320 which lowers pressure of the flash gas to prepare the fluid for introduction into the evaporator outlet stream).

In some embodiments, fluid handling system 300B may further include one or more additional heat exchangers, e.g., for exchanging heat between fluid in different portions of fluid handling system 300B. For example, fluid handling system 300B may include a heat exchanger for exchanging heat between fluid output by condenser 329 and fluid output by flash tank 313. A first flow path through the heat exchanger may be coupled between an outlet of condenser 329 and a high pressure inlet of PX 310. A second flow path through the heat exchanger may be coupled between an outlet of flash tank 313 and an outlet of evaporator 318. The heat exchanger may be configured to exchange heat between the fluid traveling along the first flow path and fluid traveling along the second flow path. The heat exchanger may transfer heat from the condenser output fluid to the flash tank output fluid. For example, at least partially liquid output fluid of flash tank 313 may receive heat from output of condenser 329. This may cause the output fluid of flash tank 313 to become a gas. Output fluid of condenser 329 may transfer heat via the heat exchanger to fluid output of flash tank 313. This may cool the fluid output of condenser 329. This may increase the liquid content of the fluid at the low pressure outlet of PX 310, which may reduce total mass flow per unit heat absorbed (e.g., by the system) and increase a coefficient of performance (COP) of the system.

In another example, fluid handling system 300B may include a heat exchanger including a first flow path coupled between output of flash tank 313 and the output stream of evaporator 318, and a second flow path coupled between output of LP booster 314 and a low pressure inlet of PX 310. The heat exchanger may facilitate the transfer of heat from fluid output by LP booster 314 to fluid output from flash tank 313. The transfer of heat via the heat exchanger may improve operation similarly as the previous example heat exchanger, e.g., may vaporize liquid and/or increase superheat of the output stream of evaporator 318, may increase COP by increasing density of fluid flowing through PX 310, etc.

In another example, fluid handling system 300B may include a heat exchanger, including a first flow path coupled between an outlet of flash tank 313 and an output stream of evaporator 318, and a second flow path coupled between a high pressure outlet of PX 310 and an inlet of flash tank 313. Heat may be provided to the output of flash tank 313. Advantages provided may be similar to previously discussed heat exchangers.

In some embodiments, fluid handling system 300B may further include an accumulator. Evaporator 318 of fluid handling system 300B may operate in a flooded state. For example, both liquid and gas may be in an output stream of evaporator 318 in some embodiments. Operating evaporator 318 in a flooded state may allow, for example, for an increased pressure on the input side of compressor 322 (e.g., compared to a system including a gaseous output stream of evaporator 318). This may reduce the pressure differential to be pumped by compressor 322, may decrease the load on compressor 322, may decrease the power consumed by compressor 322, etc. In some embodiments, fluid leaving evaporator 318 may be in a two-phase state (e.g., liquid and gas). An output stream of evaporator 318 may be provided to the accumulator. Liquid may accumulate in the accumulator. The accumulator may act as a receiver. The accumulator may provide a similar role as flash tank 313, e.g., provide a place for separating liquid and gas of the fluid stream, may provide a source of liquid and gas, etc. Gas from the accumulator may flow to compressor 322. Liquid from the accumulator may be provided to LP booster 314. In some embodiments, fluid handling system 300B may further include a liquid pump. Liquid output of the accumulator may be provided as input to the liquid pump. Output from the liquid pump may be provided as input, for example, to evaporator 318.

In some embodiments, fluid handling system 300B may include a PX high pressure valve and/or a PX on/off valve. The PX high pressure valve may control a flow of a fluid output from the high pressure outlet of the PX. The PX high pressure valve may be coupled between the high pressure outlet of the PX and an inlet of flash tank 313. Expanding the fluid through the PX high pressure valve into flash tank 313 may alter the ratio of gas to liquid of the fluid in flash tank 313. The PX on/off valve may control a flow of high pressure fluid from an outlet of condenser 329 to the high pressure inlet of PX 310. The PX high pressure valve and/or the PX on/off valve may be controlled by one or more controllers. The valves may be controlled based on measurements received from one or more sensors. For example, the PX high pressure valve may be adjusted based on a sensor reporting on the gas to liquid ratio in flash tank 313.

Fluid handling system 300B includes controllers 390, 393, and 394. Fluid handling system 300B further includes pressure gauge 380, pressure gauge 382, and thermocouple 385. Controllers of fluid handling system 300B may share similar features with controller of fluid handling system 300A, e.g., similar functions, similar construction/components, etc. Additional controllers and sensors may also be included in fluid handling system 300B.

In addition to functions discussed in connection with FIG. 3A, controller 390 may further be coupled to parallel valve 348. Controller 390 may be configured to generate a control signal for parallel valve 348 based on sensor data received from one or more sensors, e.g., pressure gauge 380. Controller 390 may be configured to maintain a target pressure of fluid of condenser 329 (e.g., a target pressure of fluid at the location of pressure gauge 380, which may be indicative of pressure of fluid of condenser 329). Pressure of fluid of condenser 329 may be affected by both operation of the PX (e.g., as influenced by operation of motor 381) and operation of parallel valve 348 (e.g., actuation of the valve, percent open of the valve, etc.). In some embodiments, controller 390 may generate a control signal for motor 381 and a control signal for parallel valve 348, based at least on measurement data received from pressure gauge 380. Controller 390 may be configured to receive as input measurements of multiple property values. For example, controller 390 may receive pressure data indicative of pressure in condenser 329 and pressure data indicative of pressure at the input of flash tank 313. Controller 390 may be configured to generate control signals to maintain target values of pressure in multiple locations, enabled by independent control of motor 381 and parallel valve 348. Controller 390 may determine a target value for one property value based on a measured value of another property value. For example, controller 390 may determine a target input fluid pressure at condenser 329 (e.g., as input to a high pressure input of PX 310) based on measured fluid pressure a flash tank 313 input (e.g., at a low pressure output of PX 310). Controller 390, controller 392, controller 394, and any other controller disclosed herein may determine a target property value based on one or more measurements of property values of the system. Controller 390 may be configured to generate control signals for optimum energy efficiency, optimum heat transfer efficiency, or the like.

Controller 392 is operatively coupled to flash gas valve 320. Controller 392 receives measurement data from one or more sensors, e.g., pressure gauge 382. Controller 392 may receive measurement data indicative of pressure (e.g., gas pressure) in flash tank 313. Controller 392 may be configured to generate a control signal for flash gas valve 320 based on measurement data received from the one or more sensors (e.g., including pressure data from a sensor of flash tank 313).

In some embodiments, a target flash tank 313 pressure may be maintained (e.g., facilitated by controller 392). Pressure of flash tank 313 may change responsive to, for example, a change in temperature of flash tank 313 or another part of fluid handling system 300B, a change in mass flow rate of fluid, a change in phase (e.g., a change in ratio between gas and liquid phase) of a portion of fluid of fluid handling system 300B, or the like. Controller 392 may be configured to maintain a target pressure of flash tank 313 by generating a control signal for flash gas valve 320 to restrict or promote flow of fluid through flash gas valve 320.

Controller 394 is operatively coupled to expansion valve 316. Controller 394 may receive temperature measurement data from thermocouple 385. Temperature measurement data from thermocouple 385 may be indicative of heat transfer in evaporator 318 (e.g., absorbed heat). Controller 394 may further receive data from additional sensors, e.g., mass flow sensors, pressure sensors, etc. Data from additional sensors may provide additional information pertinent to heat exchanged via evaporator 318 (e.g., between the fluid of fluid handling system 300B and the environment). For example, controller 394 may receive data indicating a level of super heat of fluid output from evaporator 318. Super heat, as used herein, refers to a temperature of the fluid about the temperature at which the fluid transitions from a liquid to a gas. In some embodiments, compressor 322 may become damaged if liquid is input into compressor 322. Maintaining a buffer of super heat (e.g., a temperature a threshold value above the gas to liquid transition temperature) in fluid output by evaporator 318 may protect compressor 322 from damage. Expansion valve 316 may affect, alter, control, etc., fluid flow (e.g., mass flow) to evaporator 318. Expansion valve 316 may be adjusted (e.g., an opening of expansion valve 316 may be adjusted responsive to expansions valve 316 receiving a control signal from controller 394). Controller 394 may generate a control signal for expansion valve 316 to maintain a target value of super heat in fluid output from evaporator 318. Controller 394 may generate a control signal for expansions valve 316 to maintain at least a threshold value of super heat in fluid output from evaporator 318.

In some embodiments, one or more components of fluid handling system 300B may be provided as a retrofit, as an addition to an existing fluid handling system, as an upgrade package, or the like. For example, a refrigeration system may not include PX 310, LP booster 314, or HP booster 324. All fluid input to condenser 329 in the refrigeration system may pass through compressor 322. All fluid leaving condenser 329 may pass through parallel valve 348. Components including PX 310, motor 381, LP booster 314, HP booster 324, and associated lines, junctions, etc., may be added to a system, e.g., for increasing energy efficiency of the system by introduction of PX 310 (e.g., for energy recovery, for pressure transfer, etc.).

Figure 3C:
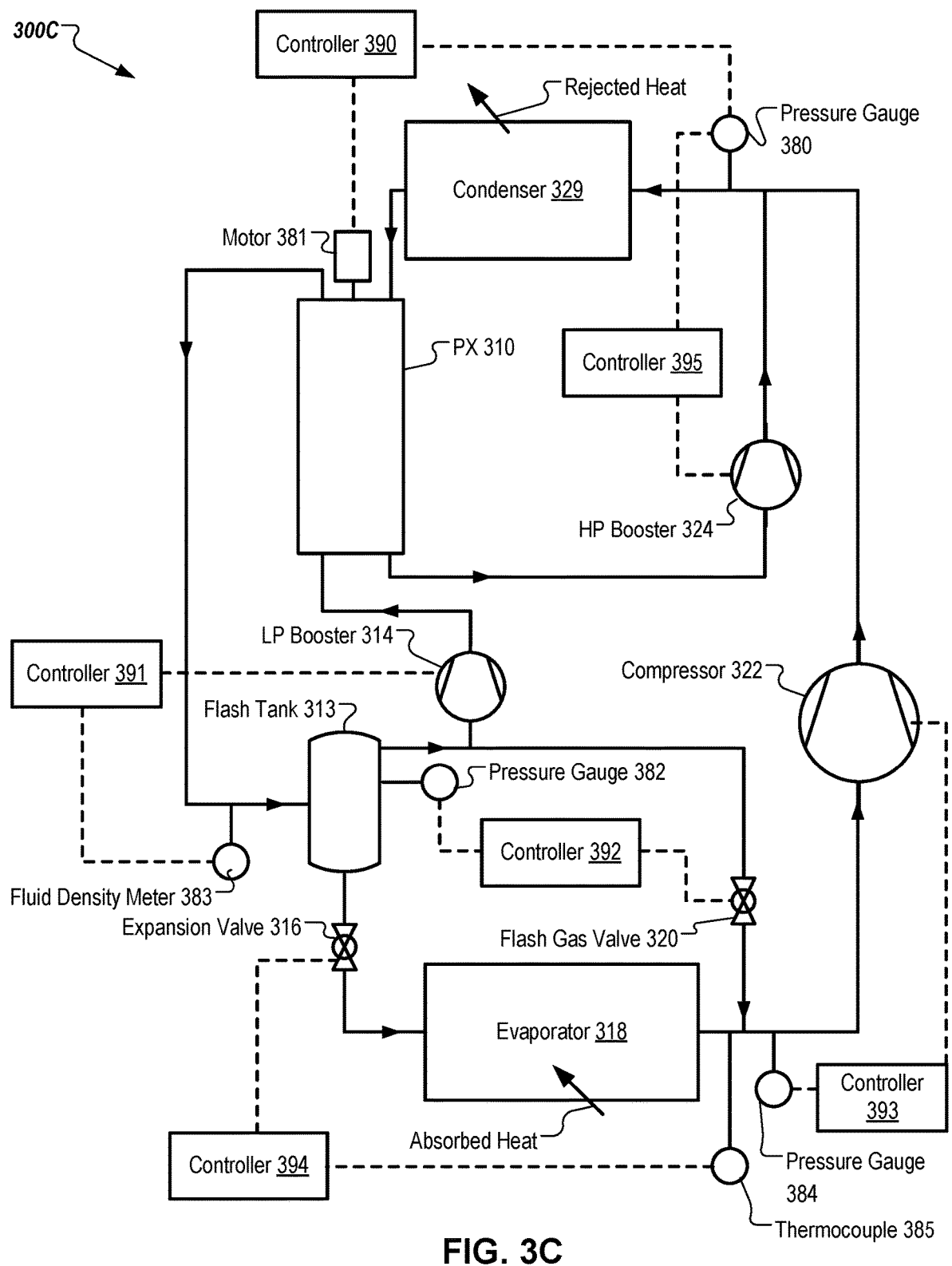

FIG. 3C is a schematic diagram of a fluid handling system 300C that includes a PX 310 according to some embodiments. In some embodiments, features that have reference numbers that are similar to reference numbers in other figures include similar properties, structures, and/or functionality as those described in other figures. In some examples, features of fluid handling system 300C have similar properties, structures, and/or functionality as one or more of fluid handling systems 300A-B of FIGS. 3A-B.

Fluid handling system 300C includes one or more of controllers 390, 391, 392, 393, 394, and/or 395. Controllers 390, 392, 393, and 394 may perform similar functions to those described in FIGS. 3A-B. Controllers of fluid handling system 300C may share features in common with controllers described in connection with FIGS. 3A-B, e.g., components comprising the controllers, function of the controllers, form and/or type of data received and output by the controllers, etc. Controller 391 is operatively coupled to LP booster 314. Controller 391 may receive measurement data from one or more sensors of fluid handling system 300C. Controller 391 may receive measurement data from fluid density meter 383 (e.g., a two phase fluid density meter). Measurement data from fluid density meter 383 may be indicative of a ratio of gas to liquid in a low pressure output stream of PX 310. Additional data indicative of a state of low pressure output from PX 310, a state of fluid input to flash tank 313, etc. (e.g., temperature data, pressure data) may be provided to controller 391.

Controller 391 may be configured to generate a control signal for LP booster 314 based on the received measurement data. LP booster 314 may be configured to adjust operation of LP booster 314 (e.g., adjust an operating speed, adjust a pumping speed, etc.) responsive to receiving the control signal. In some embodiments, a density of a fluid (e.g., a ratio of gas mass to liquid mass) output by the low pressure outlet of PX 310 may be indicative of performance of PX 310. For example, a density of fluid output by the low pressure outlet of PX 310 may be indicative of a ratio between pressure, flow rate, or the like of fluid provided to PX 310 via the high pressure inlet and the low pressure inlet of PX 310. Fluid handling system 300C may target a density of fluid output by the low pressure outlet of PX 310, may target an efficiency of pressure transfer in PX 310 (e.g., optimize energy consumption), or the like. LP booster 314 may adjust operation of LP booster 314 in response to receiving a control signal from controller 391. In some embodiments, controller 391 may, in view of received measurement data, calculate various properties of fluid of fluid handling system 300C. For example, in view of pressure, density, temperature, or the like controller 391 may calculated quality (e.g., ratio of gas to liquid), internal energy, enthalpy, etc., of fluid of fluid handling system 300C. Controller 391 may generate a control signal to achieve a target value of one or more properties, may generate a controls signal to reach a threshold of one or more properties, or the like.

Controller 395 is operatively coupled to HP booster 324. Controller 395 may receive measurement data from pressure gauge 380 (e.g., may receive measurement data also received by controller 390). Controller 395 may receive data from other sources, e.g., other sensors, other controllers, etc. In some embodiments, controller 395 receives mass flow data, e.g., from a mass flow meter disposed proximate an outlet of HP booster 324. Controller 395 may be configured to generate a control signal for HP booster 324 based on received data (e.g., measurement data). Pressure gauge 380 may generate measurement data indicative of fluid pressure of condenser 329. Pressure gauge 380 may generate measurement data indicative of pressure of fluid output by HP booster 324, measurement data indicative of pressure of fluid output by compressor 322, indicative of pressure of fluid in the mixed output stream including output of HP booster 324 and compressor 322, or the like. In some embodiments, separate pressure gauges may be utilized for controller 390 and controller 395. In some embodiments, generation of a control signal by controller 395 may be based on a mass flow measurement (e.g., HP booster 324 output mass flow measurement, a high pressure outlet of PX 310 mass flow measurement, or the like).

In some embodiments, fluid handling system 300C may be configured to maintain one or more operating conditions. For example, fluid handling system 300C may be configured to maintain a target temperature of one or more portions of fluid handling system 300C, may be configured to optimize a COP or other efficiency metric of the system, be configured to optimize energy transfer (e.g., pressure transfer) of PX 310, or the like. In some embodiments, an effect of a controller or an adjustable component (e.g., controller 395 generating a control signal for HP booster 324) may be performed empirically—e.g., the effect of various settings (e.g., pumping speeds of HP booster 324, opening of one or more valves such as expansion valve 316, etc.) may be determined by performing tests with various parameters. For example, a table of effects may be maintained and consulted by a controller when any controller generates a control signal for a controllable component of fluid handling system 300C. In some embodiments, one or more parameter curves (e.g., optimal curves) may be maintained. For example, a curve of target fluid pressure of condenser 329 as a function of ambient temperature may be stored and consulted by one or more controllers of fluid handling system 300C for generating one or more control signals.

In some embodiments, one or more controllers of a fluid handling system (e.g., fluid handling system 300C) may operate in combination with other controllers of the system. For example, control signals sent by controller 390 and control signals sent by controller 395 may both affect pressure of fluid input to condenser 329. In some embodiments, controller 390 and controller 395 may coordinate to maintain a target pressure of fluid input to condenser 329. For example, based on measurement data received from one or more other sensors, controller 390 and/or controller 395 may determine that only one of the controllers is to generate and send a control signal to an associated device, that both of the controllers are to generate and send a control signal to an associated device, that neither of the controllers are to generate and send a control signal to an associated device, etc. Controllers 390 and 395 may determine the content of control signals sent, for example, controllers 390 and 395 may generate and send control signals that together target an intended effect (e.g., achieve a target pressure of fluid input do condenser 329).

In some embodiments, a controller may receive data indicative of a control signal of another controller. For example, controller 395 may receive data indicative of a control signal sent by controller 391 to LP booster 314. An adjustment to operation of LP booster 314 may cause an adjustment to input fluid pressure, input fluid flow, etc., to HP booster 324. Controller 395 may generate a control signal for HP booster 324 to compensate for the adjusted operation of LP booster 314 (e.g., before a sensor records the increase in fluid pressure, input fluid flow, etc.; without receiving data from a sensor indicative of the increased fluid pressure, increased fluid flow, etc.; or the like). Adjustments to a control signal based on a control signal sent by another controller may be enacted subject to empirical data (e.g., a table of experimental data), calculated based on theory (e.g., heat transfer equations, fluid flow equations, etc.), or the like. In another example, operations of controller 391 and controller 392 may both have an effect on pressure of flash tank 313. Controllers 391 and 392 may work in tandem (e.g., each controller may perform operations in view of operations to be performed by the other controller) for optimizing performance of fluid handling system 300C, for maintaining a threshold value or target value of one or more property values of fluid handling system 300C, or the like. In another example, the pressure of a fluid input to compressor 322 may be used (e.g., as measured by pressure gauge 384) along with evaporator superheat (e.g., as measured by thermocouple 385) to infer total system mass flow rate. More mass flowing to evaporator 318 (e.g., accomplished by adjusting an opening of expansion valve 316) may increase pressure of fluid input to compressor 322. Expansions valve 316 may be opened (e.g., upon receiving a control signal from controller 394) and compressor 322 may increase a speed of operation (e.g., upon receiving a control signal from controller 393) responsive to the opening of expansion valve 316.

In some embodiments, controllers may exist as a unified control module, e.g., a central control module may receive various measurement data from sensors of fluid handling system 300C. The central control module may generate control signals for various adjustable components of fluid handling system 300C. The central control module may holistically determine which control signals to send, e.g., may incorporate predicted effects on various system parameters of fluid handling system 300C when generating one or more control signals for components of fluid handling system 300C.

Figure 3D:
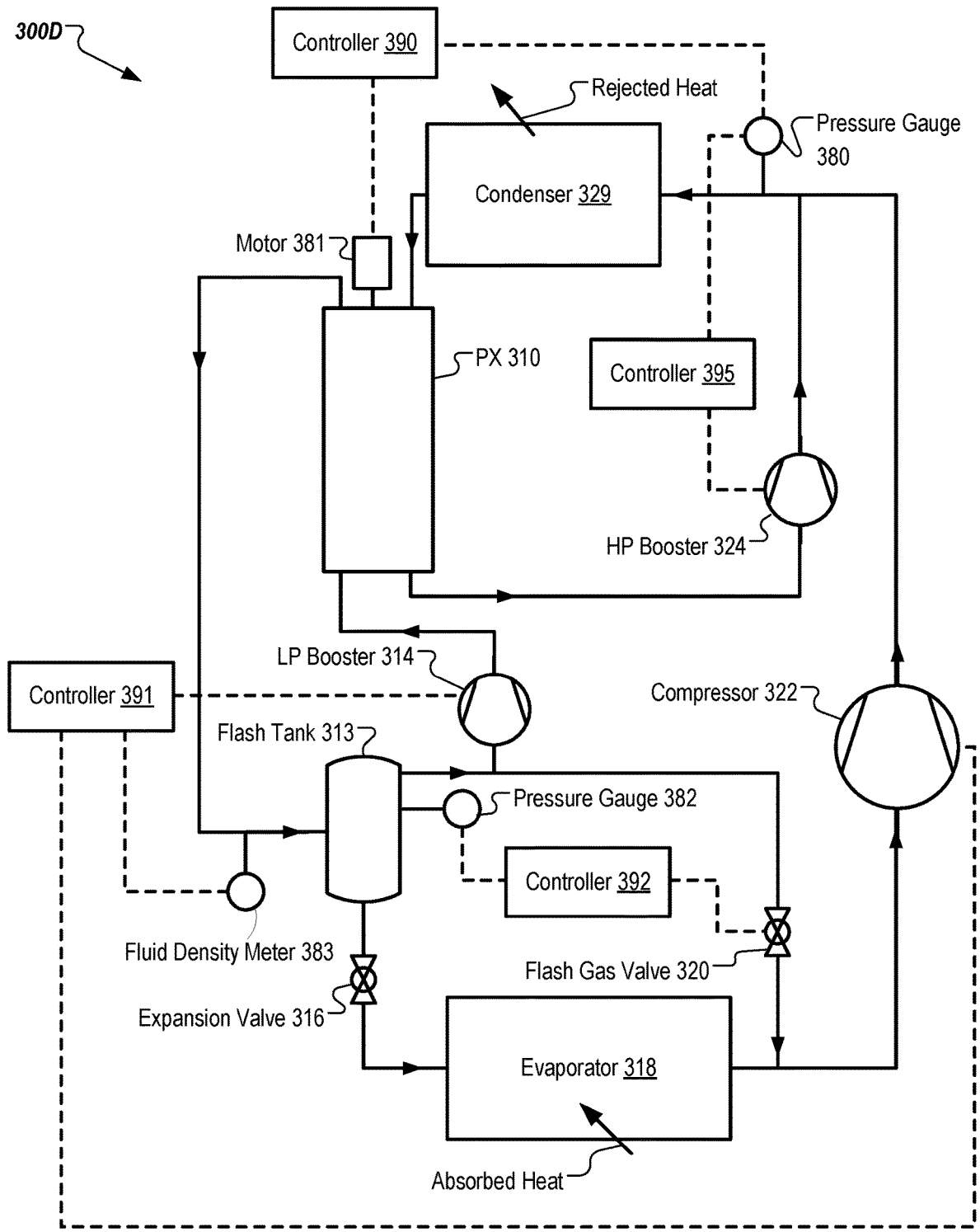

FIG. 3D is a schematic diagram of a fluid handling system 300D that includes a PX 310, according to some embodiments. In some embodiments, features that have reference numbers that are similar to reference numbers in other figures include similar properties, structures, and/or functionality as those described in other figures. In some embodiments, features of fluid handling system 300D have similar properties, structures, and/or functionality as one or more of fluid handling systems 300A-C of FIGS. 3A-C.

Fluid handling system 300D includes controller 391. Controller 391 may receive input indicative of work performed by compressor 322. Controller 391 may include a thermodynamics calculator, e.g., a thermodynamic model for calculating and/or estimating work performed on a fluid of fluid handling system 300D. Controller 391 may calculate a COP or other metric of efficiency based on measurements of fluid density meter 383 and indications of work performed by compressor 322. Controller 391 may calculate an operation of LP booster 314 to maximize COP, heat transfer, or another metric (e.g., controller 391 may calculate an ideal pumping speed of LP booster 314 based at least on work performed by compressor 322).

In some embodiments, controller 391 may receive an indication of power consumption of compressor 322. Controller 391 may receive an indication of power consumption of compressor 322 from one or more sensors configured to measure power consumption of compressor 322, configured to measure one or more property values indicative of power consumption of compressor 322, or the like. Power consumption of pumping (e.g., energy imparted to the fluid of fluid handling system 300D) may be inferred by measuring, for example, current supplied to compressor 322, voltage drop across components of compressor 322, or the like. In some embodiments, power consumption of compressor 322 and/or energy imparted to a fluid by compressor 322 may be inferred by measuring one or more properties of fluid of fluid handling system 300D, e.g., temperature and/or pressure of the fluid may be measured at one or more of the output of compressor 322, the input and output of compressor 322, mass flow through compressor 322 (e.g., mass flow data measured by a mass flow sensor), or the like.

Figure 4A:
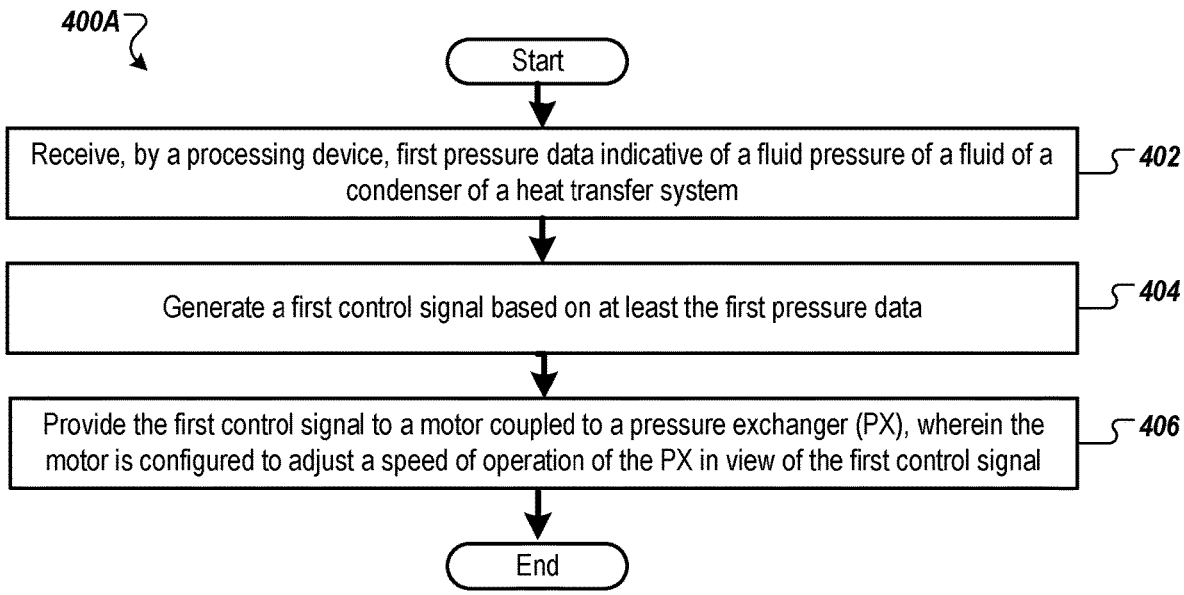
FIGS. 4A-B are flow diagrams illustrating methods for controlling fluid handling systems, according to some embodiments.
Figure 4B:
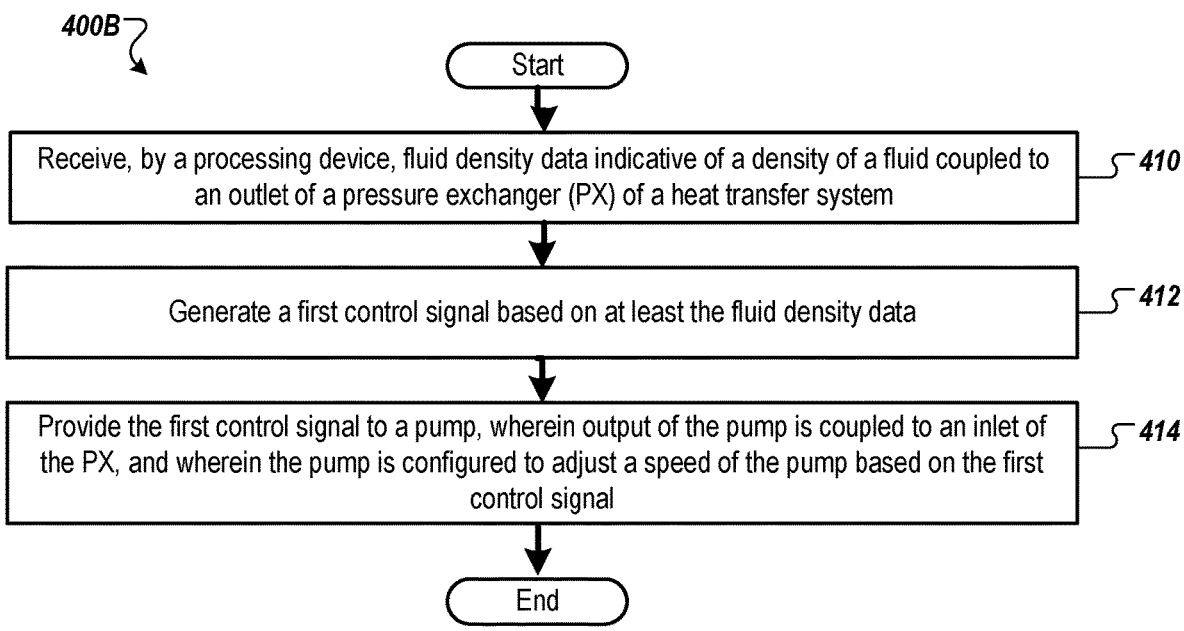

FIGS. 4A-B are flow diagrams illustrating methods 400A-B for controlling fluid handling systems (e.g., one or more of fluid handling systems 300A-D of FIGS. 3A-D), according to some embodiments. In some embodiments, methods 400A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 400A-B are performed, at least in part, by one or more controllers (e.g., control module 180 of FIGS. 1A-B, controllers 390-395 of FIGS. 3A-D). In some embodiments, a non-transitory storage medium stores instructions that when executed by one or more processing devices (e.g., of control module 180 of FIGS. 1A-B, controllers 390-395 of FIGS. 3A-D), cause the processing device to perform methods 400A-B.

For simplicity of explanation, methods 400A-B are depicted and described as a series of operations. However, operations in accordance with this disclosure can occur in various orders and/or concurrently and with other operations not presented and described herein. Furthermore, in some embodiments, not all illustrated operations are performed to implement method 600A in accordance with the disclosed subject matter. In addition, those skilled in the art will understand and appreciate that methods 400A-B are could alternatively be represented as a series of interrelated states via a state diagram or events.

FIG. 4A is a flow diagram of a method 400A for providing control of one or more components of a fluid handling system, according to some embodiments. The fluid handling system of method 400A may be a heat transfer system, a heat pump system, a refrigeration system, and/or the like (e.g., any of the architectures discussed in connection with FIGS. 3A-D).

At block 402, processing logic receives first pressure data indicative of a fluid pressure of a fluid of a condenser of a heat transfer system. The heat transfer system may be a heat pump system, a refrigeration system, or the like. Communication of the heat transfer system may be via a wired network (e.g., wired communication), a wireless network (e.g., a wireless local area network, a personal area network, the internet, or the like. Processing logic (e.g., of controller 390 of FIG. 3B) may be housed in a device at the location of the fluid handling system, a remote device (e.g., at a control center for one or more heat transfer systems), or the like.

At block 404, processing logic generates a first control signal based on at least the first pressure data. In some embodiments, the processing logic is operatively coupled to one or more components of the heat transfer system (e.g., motor 381 of FIG. 3A). In some embodiments, the first control signal may be generated based on a difference between a measured pressure and a target pressure. In some embodiments the first control signal may be generated based on multiple measurements, e.g., from multiple sensors, of multiple properties, etc. In some embodiments, the first control signal may be generated based on another control signal, e.g., may be generated based on operations performed or to be performed by one or more components of the heat transfer system.

At block 406, processing logic provides the first control signal to a motor coupled to a PX (e.g., PX 310 of FIG. 3A), wherein the motor is configured to adjust a speed of operation of the PX in view of the control signal. In some embodiments, the PX may be an isobaric PX. In some embodiments, the PX may be a rotary PX, and adjusting a speed of operation of the PX may include adjusting a speed of rotation of a rotor of the PX. In some embodiments, the PX may be a reciprocating PX, and adjusting a speed of operation of the PX may include adjusting a frequency of reciprocation of the PX. In some embodiments, the PX may be a hydraulic turbocharger PX, and adjusting a speed of operation of the PX may include adjusting a speed of rotation of one or more turbines of the PX.

In some embodiments, the heat transfer system may include additional processing logic (e.g., additional controllers). The additional processing logic may generate control signals for additional components of the heat transfer system.

In some embodiments, the heat transfer system may include processing logic (e.g. of a controller) that receives temperature data indicative of a temperature of a fluid of an evaporator of the heat transfer system. Temperature may be measured in the evaporator, proximate to the evaporator, of fluid output by the evaporator, etc. The processing logic may generate a control signal based on at least the temperature data. The processing logic may provide the control signal to a valve coupled between an output of a flash tank (e.g., receiver) of the heat transfer system and an inlet of the evaporator. The valve may be configured to adjust an opening of the valve based on the second control signal. The adjustment of the opening valve may facilitate fluid exiting the evaporator having a target value of super heat. The processing logic of this process may be integrated with the processing logic of block 402 or be separate from the processing logic of block 402 (e.g., may be executed by a different device than processing logic of block 402).

In some embodiments, the heat transfer system may include processing logic (e.g., of a controller) that receives fluid density data indicative of density of a fluid provided to an inlet of a flash tank of the heat transfer system (e.g., data generated by a two phase fluid density meter of the heat transfer system). The processing logic may generate a control signal based at least on the fluid density data. The processing logic may provide the control signal to a pump of the heat transfer system. The pump may be coupled between an output of the flash tank and an inlet of the PX, e.g., a low pressure inlet of the PX. The pump may be configured to adjust a speed of operation of the pump based on the control signal. The processing logic of this process may be integrated with or separate from any other processing logic (e.g., any other controllers) described herein. Processing logic of any control process described herein may be combined with processing logic (e.g., executed by the same device) as any other control process described herein.

In some embodiments, the heat transfer system may include processing logic (e.g., of a controller) configured to receive measurement data indicative of pressure of fluid output of a pump (e.g., HP booster 324 of FIG. 3D). For example, a pump may be coupled between an outlet (e.g., a high pressure outlet) of the PX and an inlet of a condenser. Pressure data may be measured between the pump and the inlet of the condenser. Pressure data may be indicative of a pressure of fluid in the condenser. The processing logic may generate a control signal based at least on the pressure measurement data. The processing logic may provide the control signal to the pump.

In some embodiments, the heat transfer system may include processing logic (e.g., a controller) configured to receive measurement data indicative of pressure of fluid in a flash tank of the heat transfer system. The processing logic may generate one or more control signals based on at least the pressure measurement data. The processing logic may provide the control signals to one or more valves (e.g., electronic expansion valves) coupled to one or more outputs of the flash tank. The valves may be configured to adjust an opening of the valves (e.g., to promote or restrict fluid flow through the valves) based on the control signals.

In some embodiments, the heat transfer system may include processing logic (e.g., a controller) configured to receive pressure measurement data indicative of pressure of fluid input to a compressor (e.g., suction pressure of the compressor). The processing logic may generate a control signal based on at least the pressure measurement data. The processing logic may provide the control signal to the compressor. The compressor may be configured to adjust a speed of operation of the compressor based on the control signal.

FIG. 4B is a flow diagram of a method 400B for providing control of one or more components of a fluid handling system, according to some embodiments. The fluid handling system may share similar features with the system described in connection with FIG. 4A.

At block 410, processing logic (e.g., of a controller) receives fluid density data indicative of a density of a fluid coupled to an outlet (e.g., a low pressure outlet) of a PX of a heat transfer system. In some embodiments, the processing logic may further receive an indication of power consumption of a compressor. In some embodiments, the processing logic may receive an indication of temperature of a fluid output by the compressor. In some embodiments, the processing logic may receive an indication of output of the compressor (e.g., mass flow, fluid flow, pumping speed, etc.). The heat transfer system, the processing logic, communication mediums of the processing logic, etc., may share features with similar components and systems described in connection with FIG. 4A.

At block 412, processing logic generates a first control signal based on at least the fluid density data. In some embodiments, the first control signal may be further based on the indication of power consumption of the compressor. In some embodiments, the first control signal may be further based on the indication of temperature of the fluid output by the compressor. In some embodiments, the first control signal may be further based on the indication of output (e.g., mass flow) of the compressor. In some embodiments, output of the compressor is coupled to an inlet of a condenser of the heat transfer system.

At block 414, processing logic provides the first control signal to a pump. The pump is coupled to an inlet of the PX (e.g., output of the pump is coupled to a low pressure inlet of the PX). The pump is configured to adjust a speed of the pump based on the first control signal.

Figure 5:
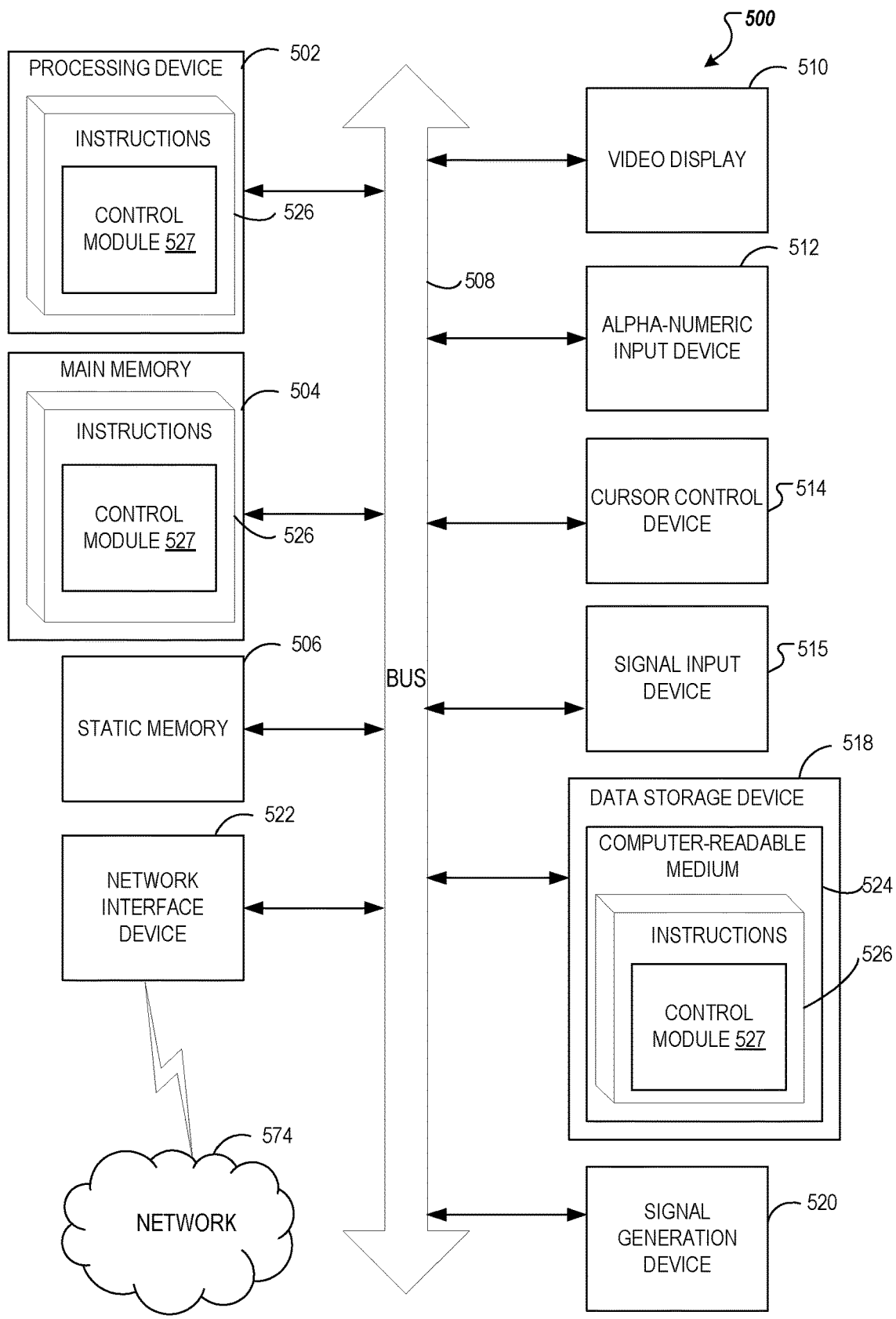
FIG. 5 is a block diagram illustrating a computer system, according to certain embodiments

FIG. 5 is a block diagram illustrating a computer system 500, according to some embodiments. In some embodiments, the computer system 500 is a client device. In some embodiments, the computer system 500 is a controller device (e.g., server, control module 180 of FIGS. 1A-B, controllers 390-395 of FIGS. 3A-D, etc.).

In some embodiments, computer system 500 is connected (e.g., via a network, such as a Local Area Network (LAN), an intranet, an extranet, or the Internet) to other computer systems. Computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In some embodiments, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and/or a data storage device 516, which communicates with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), a PID controller, or a network processor). In some embodiments, processing device 502 is provided by one or more of a single processor, multiple processors, a single processor having multiple processing cores, and/or the like.

In some embodiments, computer system 500 further includes a network interface device 522 (e.g., coupled to network 574). In some embodiments, the computer system 500 includes one or more input/output (I/O) devices. In some embodiments, computer system 500 also includes a video display unit 510 (e.g., a liquid crystal display (LCD)), an alphanumeric input device 512 (e.g., a keyboard), a cursor control device 514 (e.g., a mouse), and/or a signal generation device 520. Computer system 500 may include signal input device 515, e.g., for receiving signals from other devices. For example, signal input device 515 may facilitate reception by computer system 500 of measurement data from sensors associated with a fluid handling system. Signal generate device 520 may be utilized to generate and/or send control signals for sending instructions to one or more components of a fluid handling system.

In some implementations, data storage device 518 (e.g., disk drive storage, fixed and/or removable storage devices, fixed disk drive, removable memory card, optical storage, network attached storage (NAS), and/or storage area-network (SAN)) includes a non-transitory computer-readable storage medium 524 on which stores instructions 526 encoding any one or more of the methods or functions described herein, and for implementing methods described herein. Control module 527 (e.g., including any of controllers 390-395 of FIGS. 3A-D) may be included in instructions 526.

In some embodiments, instructions 526 also reside, completely or partially, within volatile memory 504 and/or within processing device 502 during execution thereof by computer system 500, hence, volatile memory 504 and processing device 502 also constitute machine-readable storage media, in some embodiments.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise or clear from context, terms such as "actuating," "adjusting," "causing," "controlling," "determining," "identifying," "providing," "receiving," "generating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The preceding description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure. Descriptions of systems herein may include descriptions of one or more optional components. Components may be included in combinations not specifically discussed in this disclosure, and still be within the scope of this disclosure. For example, any of controllers 390-395 of FIGS. 3A-D, alone or in any combination, may be included in a fluid handling system that is within the scope of this disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about," "substantially," or "approximately" is used herein, this is intended to mean that the nominal value presented is precise within ±10%. Also, the terms "first," "second," "third," "fourth," etc. as used herein are meant as labels to distinguish among different elements and can not necessarily have an ordinal meaning according to their numerical designation.

The terms "over," "under," "between," "disposed on," "before," "after," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers or components.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which each claim is entitled.

What is claimed is:

1. A system comprising:
   a pressure exchanger (PX) coupled to a motor, wherein the motor is configured to control an operating speed of the PX;
   a condenser, wherein an outlet of the condenser is fluidly coupled to a first inlet of the PX;
   a first pressure gauge configured to provide first pressure data indicative of a pressure of a fluid of the condenser; and
   a first controller configured to cause, based on the first pressure data, the motor to adjust the operating speed of the PX.

2. The system of claim 1, further comprising:
   a compressor, wherein an outlet of the compressor is fluidly coupled to an inlet of the condenser;
   a second pressure gauge configured to provide second pressure data indicative of a pressure of a fluid input to the compressor; and
   a third controller configured to cause, based on the second pressure data, adjustment of an operating speed of the compressor.

3. The system of claim 1, further comprising:
an evaporator;
a pump, wherein an outlet of the pump is fluidly coupled to a second inlet of the PX;
a flash tank, wherein a flash tank inlet is fluidly coupled to an outlet of the PX, and wherein a first flash tank outlet is fluidly coupled to the pump, and wherein a second flash tank outlet is fluidly coupled to an inlet of the evaporator;
a temperature sensor configured to provide first temperature data indicative of a temperature of fluid discharged from the evaporator; and
a second controller configured to cause, based on the first temperature data, actuation of a valve fluidly coupled between the flash tank and the evaporator.

4. The system of claim 3, wherein the second controller is configured to maintain a target value of super heat of an output fluid of the evaporator.

5. The system of claim 1, further comprising:
an evaporator;
a flash tank, wherein a flash tank inlet is fluidly coupled to an outlet of the PX, and wherein a first flash tank outlet is fluidly coupled to an outlet of the evaporator, and wherein a second flash tank outlet is fluidly coupled to an inlet of the evaporator;
a valve, fluidly coupled between the first flash tank outlet and the outlet of the evaporator;
a pressure gauge configured to provide second pressure data indicative of a pressure of fluid in the flash tank; and
a second controller configured to cause, based on the second pressure data, actuation of a valve fluidly coupled between the first flash tank outlet and the outlet of the evaporator.

6. The system of claim 1, further comprising:
a pump, wherein an inlet of the pump is fluidly coupled to an outlet of the PX, and wherein an outlet of the pump is fluidly coupled to an inlet of the condenser; and
a second controller configured to cause, based on the first pressure data, adjustment of a speed of operation of the pump.

7. The system of claim 1, further comprising:
a pump, wherein an outlet of the pump is fluidly coupled to a second inlet of the PX;
a fluid density sensor configured to generate fluid density data associated with a first output fluid of the PX; and
a second controller configured to cause, based on at least the fluid density data, adjustment of an operating speed of the pump.

8. The system of claim 1, further comprising:
a pump, wherein an outlet of the pump is fluidly coupled to a second inlet of the PX;
a compressor, wherein an outlet of the compressor is fluidly coupled to an inlet of the condenser;
a sensor configured to measure power consumption of the compressor; and
a second controller configured to cause, based on the power consumption of the compressor, adjustment of an operating speed of the pump.

9. The system of claim 1, further comprising:
a pump, wherein an outlet of the pump is fluidly coupled to a second inlet of the PX;
a compressor, wherein an outlet of the compressor is fluidly coupled to an inlet of the condenser;
a temperature sensor configured to generate temperature data indicative of a temperature of a fluid of the compressor; and
a second controller configured to cause, based on the temperature data, adjustment of an operating speed of the pump.

10. A non-transitory machine-readable storage medium storing instructions which, when executed, cause a processor to perform operations comprising:
identifying first pressure data indicative of a fluid pressure of a fluid of a condenser of a heat transfer system;
generating a first control signal based on at least the first pressure data; and
causing, based on the first control signal, a motor to adjust a speed of operation of a pressure exchanger (PX).

11. The non-transitory machine-readable storage medium of claim 10, wherein the heat transfer system comprises a refrigeration system.

12. The non-transitory machine-readable storage medium of claim 10, wherein an outlet of the condenser is fluidly coupled to an inlet of the PX, and wherein the fluid pressure of the fluid of the condenser is regulated by the speed of operation of the PX.

13. The non-transitory machine-readable storage medium of claim 10, wherein the operations further comprise:
receiving temperature data indicative of a temperature of a fluid of an evaporator of the heat transfer system;
generating a second control signal based on at least the temperature data; and
causing, based on the second control signal, actuation of a valve that is fluidly coupled between an outlet of a flash tank of the heat transfer system and an inlet of the evaporator.

14. The non-transitory machine-readable storage medium of claim 13, wherein the causing of the actuation of the valve is to cause a value of super heat of an output fluid of the evaporator to meet a threshold value.

15. The non-transitory machine-readable storage medium of claim 10, wherein the operations further comprise:
receiving fluid density data indicative of a density of a fluid provided to an inlet of a flash tank of the heat transfer system;
generating a second control signal based on the fluid density data; and
causing, based on the second control signal, adjustment of a speed of operation of a pump that is fluidly coupled between an outlet of the flash tank and an inlet of the PX.

16. A system comprising:
memory; and
a processor coupled to the memory, wherein the processor is configured to:
identify first pressure data indicative of a fluid pressure of a fluid of a condenser of a heat transfer system;
generate a first control signal based on at least the first pressure data; and
cause, based on the first control signal, a motor to adjust a speed of operation of a pressure exchanger (PX).

17. The system of claim 16, wherein the heat transfer system comprises a refrigeration system.

18. The system of claim 16, wherein an outlet from the condenser is fluidly coupled to an inlet of the PX, and wherein the fluid pressure of the fluid of the condenser is regulated by the speed of operation of the PX.

19. The system of claim 16, wherein the processor is further configured to:
- receive temperature data indicative of a temperature of a fluid of an evaporator of the heat transfer system;
- generate a second control signal based on at least the temperature data; and
- cause, based on the second control signal, actuation of a valve that is fluidly coupled between an outlet of a flash tank of the heat transfer system and an inlet of the evaporator.

20. The system of claim 16, wherein the processor is further configured to:
- receive fluid density data indicative of a density of a fluid provided to an inlet of a flash tank of the heat transfer system;
- generate a second control signal based on the fluid density data; and
- cause, based on the second control signal, adjustment of a speed of operation of a pump that is fluidly coupled between an outlet of the flash tank and an inlet of the PX.

* * * * *